(12) United States Patent  (10) Patent No.: US 8,861,890 B2
Lefler  (45) Date of Patent: Oct. 14, 2014

(54) SYSTEM AND METHOD FOR ASSEMBLING AND DISPLAYING INDIVIDUAL IMAGES AS A CONTINUOUS IMAGE

(76) Inventor: Douglas Alan Lefler, West Toluca Lake, CA (US)

( * ) Notice: Subject to any disclaimer, the term of this patent is extended or adjusted under 35 U.S.C. 154(b) by 512 days.

(21) Appl. No.: 12/953,459

(22) Filed: Nov. 24, 2010

(65) Prior Publication Data

US 2012/0131463 A1  May 24, 2012

(51) Int. Cl.
| | | |
|---|---|---|
| *G06K 9/32* | (2006.01) | |
| *G06T 13/00* | (2011.01) | |
| *G09G 5/00* | (2006.01) | |
| *G06T 13/80* | (2011.01) | |
| *G06F 3/0483* | (2013.01) | |
| *G11B 27/10* | (2006.01) | |

(52) U.S. Cl.
CPC .............. *G06T 13/80* (2013.01); *G06F 3/0483* (2013.01); *G11B 27/105* (2013.01)
USPC ........... 382/294; 345/473; 345/619; 345/625; 345/629

(58) Field of Classification Search
USPC ............................ 382/294; 715/730; 345/473
See application file for complete search history.

(56) References Cited

U.S. PATENT DOCUMENTS

| | | | |
|---|---|---|---|
| 5,353,392 A | 10/1994 | Luquet et al. | |
| 5,543,413 A | 8/1996 | Townsend et al. | |
| 5,577,179 A | 11/1996 | Blank et al. | |
| 5,623,587 A | 4/1997 | Bulman et al. | |
| 5,657,402 A | 8/1997 | Bender et al. | |
| 5,687,306 A | 11/1997 | Blank et al. | |
| 5,692,117 A * | 11/1997 | Berend et al. ................. 345/475 |
| 5,768,439 A | 6/1998 | Suzuka et al. | |
| 5,805,784 A * | 9/1998 | Crawford ...................... 345/473 |
| 5,838,837 A | 11/1998 | Hirosawa et al. | |
| 5,844,565 A | 12/1998 | Mizutani et al. | |
| 5,852,674 A | 12/1998 | Takahashi et al. | |
| 5,911,146 A * | 6/1999 | Johari et al. ................... 715/234 |
| 5,920,657 A | 7/1999 | Bender et al. | |
| 5,930,411 A | 7/1999 | Kojima et al. | |
| 5,991,444 A | 11/1999 | Burt et al. | |
| 5,999,662 A | 12/1999 | Burt et al. | |
| 6,005,987 A | 12/1999 | Nakamura et al. | |
| 6,075,905 A | 6/2000 | Herman et al. | |
| 6,078,699 A | 6/2000 | Lobregt et al. | |
| 6,078,701 A | 6/2000 | Hsu et al. | |
| 6,097,833 A | 8/2000 | Lobregt et al. | |
| 6,104,840 A | 8/2000 | Ejiri et al. | |
| 6,128,416 A | 10/2000 | Oura et al. | |
| 6,137,920 A | 10/2000 | Mead et al. | |
| 6,148,118 A | 11/2000 | Murakami et al. | |
| 6,151,421 A | 11/2000 | Yamada et al. | |
| 6,185,342 B1 | 2/2001 | Hamburg et al. | |
| 6,345,244 B1 * | 2/2002 | Clark ................................ 704/2 |

(Continued)

*Primary Examiner* — Michelle Entezari

(74) *Attorney, Agent, or Firm* — The Eclipse Group LLP

(57) ABSTRACT

A system for continuously displaying individual images to present a visual narrative is provided. The system includes a storage module that stores multiple digital images. The images include image data that corresponds to a portion of a least one panel of narrative artwork. At least one of the images includes image data that corresponds to a transition that conforms to a visual grammar. An image processor retrieves the images from the storage module and arranges the image data of the images in an ordered configuration according to a predetermined sequence. The predetermined sequence specifies an order for the images. A display module accesses the ordered image data for display as a continuous image.

38 Claims, 21 Drawing Sheets

(56) References Cited

U.S. PATENT DOCUMENTS

| | | | |
|---|---|---|---|
| 6,389,179 B1 | 5/2002 | Katayama et al. | |
| 6,393,162 B1 | 5/2002 | Higurashim et al. | |
| 6,393,163 B1 | 5/2002 | Burt et al. | |
| 6,424,752 B1 | 7/2002 | Katayama et al. | |
| 6,434,279 B1 | 8/2002 | Shiba | |
| 6,459,821 B1 | 10/2002 | Cullen | |
| 6,470,100 B2 | 10/2002 | Horiuchi | |
| 6,522,789 B2 | 2/2003 | Takahashi et al. | |
| 6,526,182 B2 | 2/2003 | Morita | |
| 6,532,036 B1 | 3/2003 | Peleg et al. | |
| 6,549,681 B1 | 4/2003 | Takiguchi et al. | |
| 6,563,960 B1 | 5/2003 | Chan et al. | |
| 6,571,022 B2 | 5/2003 | Okisu et al. | |
| 6,584,235 B1 | 6/2003 | Fossum et al. | |
| 6,587,598 B1 | 7/2003 | Devillers et al. | |
| 6,687,419 B1 | 2/2004 | Atkin et al. | |
| 6,690,387 B2 | 2/2004 | Zimmerman et al. | |
| 6,697,752 B1 | 2/2004 | Korver et al. | |
| 6,714,689 B1 | 3/2004 | Yano et al. | |
| 6,717,614 B1 | 4/2004 | Lida | |
| 6,754,378 B2 | 6/2004 | Ito et al. | |
| 6,798,923 B1 | 9/2004 | Hsieh et al. | |
| 6,804,413 B1 | 10/2004 | Horie et al. | |
| 6,912,324 B2 | 6/2005 | Fossum et al. | |
| 6,980,699 B1 | 12/2005 | Okada | |
| 7,076,116 B2 | 7/2006 | Horie et al. | |
| 7,085,435 B2 | 8/2006 | Takiguchi et al. | |
| 7,095,905 B1 | 8/2006 | Peterson et al. | |
| 7,123,264 B2 | 10/2006 | Tojo et al. | |
| 7,123,779 B2 | 10/2006 | Beuker et al. | |
| 7,181,081 B2 | 2/2007 | Sandrew | |
| 7,236,647 B2 | 6/2007 | Lunetta et al. | |
| 7,366,360 B2 | 4/2008 | Takiguchi et al. | |
| 7,383,499 B2* | 6/2008 | Kraft et al. | 715/246 |
| 7,409,111 B2 | 8/2008 | Sakimura et al. | |
| 7,446,781 B2 | 11/2008 | O'Donnell et al. | |
| 7,474,801 B2 | 1/2009 | Teo et al. | |
| 7,535,497 B2 | 5/2009 | Ouchi et al. | |
| 7,535,499 B2 | 5/2009 | Takata et al. | |
| 7,557,818 B1 | 7/2009 | Ubillos et al. | |
| 7,668,402 B2 | 2/2010 | Grindstaff et al. | |
| 7,770,109 B2* | 8/2010 | Fortes | 715/246 |
| 7,786,975 B2 | 8/2010 | Ording et al. | |
| 7,787,144 B2 | 8/2010 | Yokota | |
| 7,787,664 B2 | 8/2010 | Luo et al. | |
| 8,643,667 B2* | 2/2014 | Alessi et al. | 345/619 |
| 2003/0090506 A1* | 5/2003 | Moore et al. | 345/730 |
| 2004/0220812 A1* | 11/2004 | Bellomo et al. | 704/275 |
| 2005/0188294 A1 | 8/2005 | Kuchinsky et al. | |
| 2006/0166172 A1* | 7/2006 | May | 434/185 |
| 2006/0188175 A1 | 8/2006 | Takiguchi et al. | |
| 2006/0197879 A1* | 9/2006 | Covell et al. | 348/700 |
| 2007/0098300 A1 | 5/2007 | Komiya et al. | |
| 2008/0079972 A1* | 4/2008 | Goodwin et al. | 358/1.12 |
| 2008/0301578 A1* | 12/2008 | Olson | 715/802 |
| 2009/0051692 A1* | 2/2009 | Gralley | 345/473 |
| 2009/0235162 A1* | 9/2009 | Nuccio et al. | 715/255 |
| 2011/0115799 A1* | 5/2011 | Imbruce | 345/473 |
| 2011/0126106 A1* | 5/2011 | Ben Shaul et al. | 715/723 |

\* cited by examiner

SYSTEM AND METHOD FOR ASSEMBLING AND DISPLAYING INDIVIDUAL IMAGES AS A CONTINUOUS IMAGE

FIELD OF THE INVENTION

This invention relates to digital publishing and more particularly to a system and method of assembling and displaying individual images as a continuous image.

BACKGROUND

The proliferation of computing devices has had an effect on many industries as those industries adapt to the efficiencies and opportunities provided by computing technology. One such industry is the publication industry, which has embraced the advances in computing technology to present content in a digital format on a variety of computing devices. The use of personal computers, hand-held devices, and even cellular telephones for viewing various types of media such as books, magazines, and newspapers continues to grow at a rapid pace.

The comic book industry has also kept pace with advancements in digital publication technologies to present content electronically. Comic books are forms of visual narratives often presenting individual panels of narrative artwork on multiple pages in a book-like format. Known systems and methods for digital publication of visual narratives such as comic books may seek to simulate the book-like experience a printed comic book provides. However, the book-like format of printed comic books may not translate well or be well-adapted for display on a computing device. For example, panels of printed comic books may be organized in a portrait-like layout, which may not easily fit on the display of a computing device. Other known systems and methods may attempt to modernize electronically presented comic books presented electronically by adding animation, recorded dialog, or sound effects to the visual narrative. However, such known systems and methods may compete with fully animated or live-action narratives having similar elements.

Thus, there exists a need for new system and method for electronically presenting a visual narrative on a computing device.

SUMMARY

A system for continuously displaying individual images to present a visual narrative is provided. The system includes a storage module that stores multiple digital images. The images include image data that corresponds to a portion of a least one panel of narrative artwork. At least one of the images includes image data that corresponds to a transition that conforms to a visual grammar. An image processor retrieves the images from the storage module and arranges the image data of the images in an ordered configuration according to a predetermined sequence. The predetermined sequence specifies an order for the images. A display module accesses the ordered image data for display as a continuous image.

A non-transitory computer readable storage medium with an executable program stored thereon for continuously presenting individual images to present a visual narrative is also provided. The program instructs a processing device to request multiple digital images from a storage module. The digital images include image data that corresponds to a portion of at least one panel of narrative artwork. The images also include image data that correspond to a transition that conforms to a visual grammar. The program also instructs the processing device to arrange the image data of the images in an ordered configuration according to a predetermined sequence. The predetermined sequence specifies an order for the images. The program further instructs the processing device to access the ordered image data for display as a continuous image.

Additionally, a method for modifying individual images to present a visual narrative is provided. The method includes the step of digitizing multiple images that include a portion of at least one panel of narrative artwork to obtain multiple digital images. The digital images include image data corresponding to the portion of the at least one panel of narrative artwork. The method also includes the step of modifying at least one of the images or the digital images to include a transition. The transition conforms to a visual grammar. The method further includes the step of generating a sequence that specifies an order for the digital images such that, when the digital images are displayed, the digital images are displayed as a continuous image.

DETAILED DESCRIPTION

A system and method for displaying individual images as a continuous image enables individual images to be ordered and arranged as a continuous image for display when presenting a visual narrative on a computing device. Further, the continuous image may be displayed such that the edges of adjacent images are undetectable to a viewer. Transitions are provided with the individual images that allow one image to seamlessly flow into the next image. The transitions also function to eliminate any confusion or ambiguity regarding where one scene of the visual narrative ends and where the next scene begins.

Figure 1:
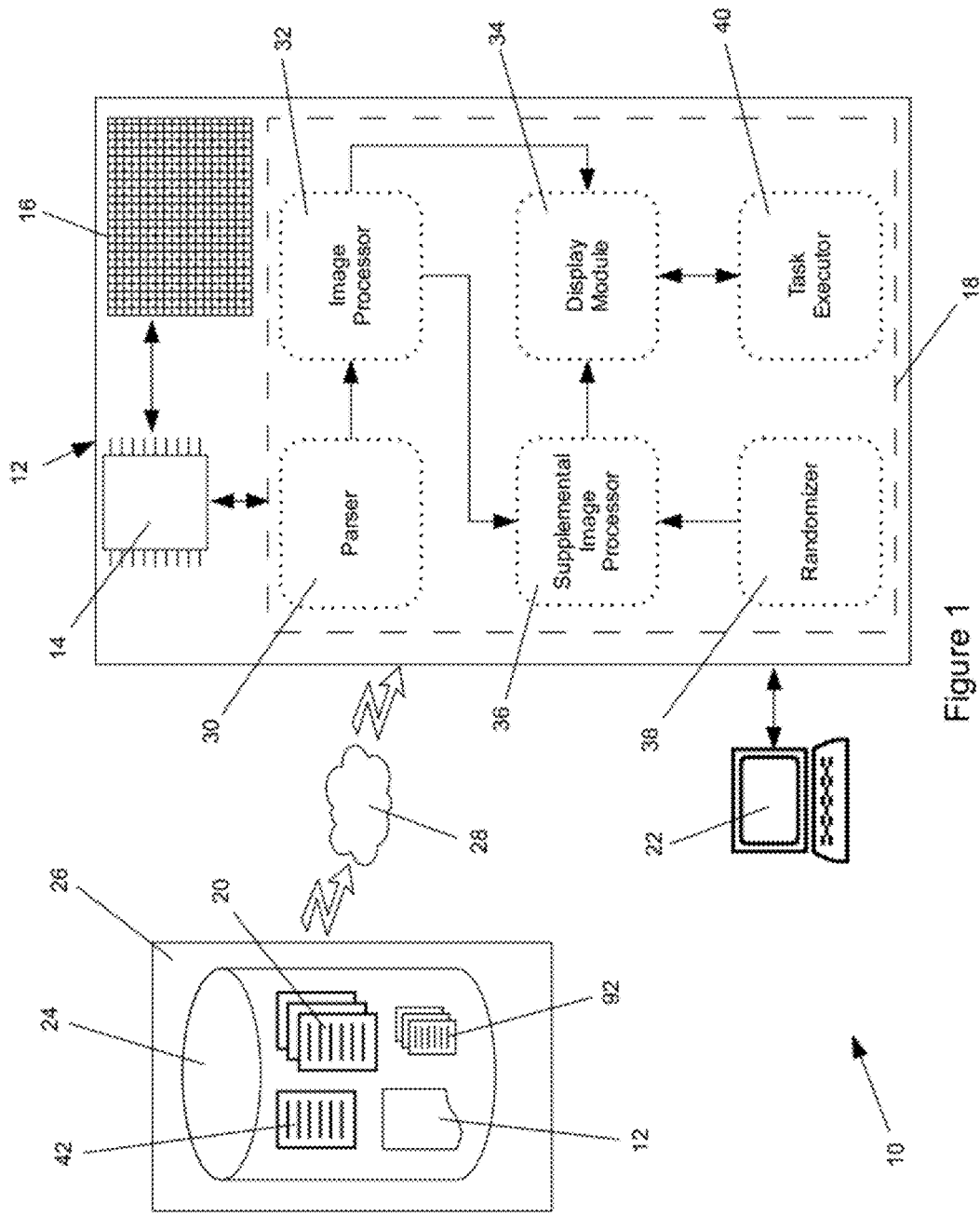
FIG. 1 is a system diagram of an example system for displaying individual images as a continuous image.

Referring to FIG. 1, a system diagram of an example system 10 for displaying individual images as a continuous image is shown. A computing device 12 includes a processing device 14, a memory 16, and an application program 18. Digital image files 20 may be stored at the memory 16 of the computing device 12, and the application program 18 arranges and assembles, using the processing device 14, the digital image files for display as a continuous image. The continuous image may be presented on a display device 22 coupled to the computing device 12.

The digital image files 20 may selectively be stored at a storage module 24 of a host 26 remote from the computing device 12 and coupled to a network 28 such as, for example, the Internet. Accordingly, the computing device 12 may operate as a client also coupled to the network 28 and transmit to the host 26 a request for the digital image files 20. In turn, the host 26 may respond by transmitting to the client 12 the requested digital image files 20. The digital image files 20 may, for example, be stored as JPEG images. Those skilled in the art will recognize that additional or alternative image formats may selectively be employed.

The application program 18 may be, for example, a software application having various components for displaying individual images as a continuous image. The software application 18 may include the following components: a parser 30, an image processor 32, a display module 34, a supplemental image processor 36, a randomizer 38, and a task executor 40. Each component will be discussed in turn below. Those skilled in the art that additional or alternative components for displaying images as a continuous image may selectively be employed.

The application program 18 may be written in, for example, the ActionScript programming language on the Adobe Flash platform. Further, the ActionScript program code may be compiled into a Short Web File (SWF)-formatted file, which may be used to present the individual images as a continuous image on a computing device. The compiled application program 18 may also be stored at the storage module 24 of a host 26, in the memory 16 of a computing device 12, and/or in a non-transitory computer-readable storage medium. Like the image files 20, the application program 18 may also be stored at the host and transmitted across the network to a client upon request. Additional or alternative programming languages, development platforms, and/or file formats may selectively be employed for the application program that displays the individual images as a continuous image.

The system 10 for displaying individual images 20 as a continuous image may also use a predetermined sequence 42 that specifies an order for the individual images displayed as a continuous image. The predetermined sequence 42 may be, for example, a digital listing that specifies the order in which the individual images 20 should be displayed when displayed as a continuous image. The digital listing 42 may be stored in the memory 16 of the computing device 12 and/or at the host 26, as shown by way of example in FIG. 1, and transmitted across the network 28 to a client 12 upon request.

The processing device 14 may be any form of microprocessor, analog or digital, capable of executing instructions or code. The memory 16 and storage module 24 may be any form of data storage mechanism accessible by the processing device 14 or any combination of such forms, such as, a magnetic media, an optical disk, a random access memory (RAM), a flash memory, or an electrically erasable programmable read-only memory (EEPROM).

The display device 22 should be broadly construed to include any device operable to convert electrical signals into information presented to the user in some visually perceivable form, such as a liquid crystal display (LCD), a cathode-ray tube (CRT) display, an electroluminescent display (ELD), a heads-up display (HUD), a plasma display panel (PDP), or a vacuum fluorescent display (VFD).

Figure 2:
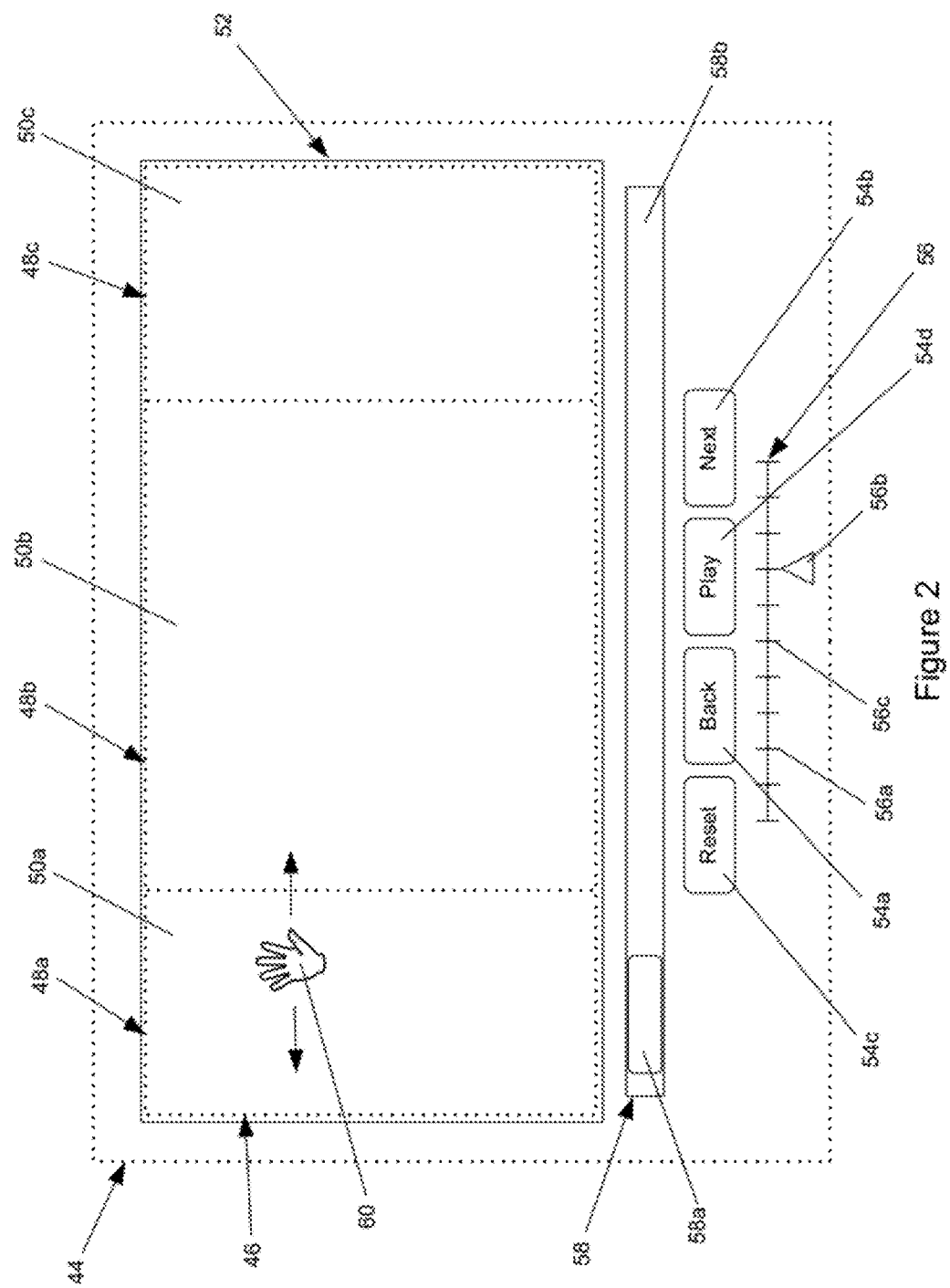
FIG. 2 is an example interface that may be used for displaying individual images as a continuous image on a display device.

Referring now to FIG. 2, an example interface 44 that may be used for displaying individual images as a continuous image 46 on a display device 22 is shown. As discussed above and explained further below, the continuous image 46 is composed of individual images 48*a-c* adjacently arranged in sequence. Each individual images 48*a-c* includes a respective panel 50*a-c* that may represent, for example, a scene of a visual narrative similar to the traditional panels of printed comic books. The individual images 48*a-c* may also include other elements such as borders and transitions that assist in the presentation of the individual images as a continuous image as explained further below. Thus, the continuous image 46 may include a sequence of panels 50*a-c* where the edges between each panel are not discernable to a viewer.

The interface 44 includes a display window 52 for displaying a portion of the continuous image 46. Those skilled in the art will understand that, because the continuous image 46 may be larger than the display window 52, the display window may only display a portion of the continuous image at any given moment. For example, the display window 52 may display one panel 50*b* of the continuous image 46 at a time. Accordingly, the interface 44 may include one or more interface controls 54-60 for controlling what portion of the continuous image 46 is displayed at the display window 52. The interface controls 54-60 may be used to translate the continuous image 46 in a particular direction to display a different portion of the continuous image.

The interface 44 in the example shown includes a variety of interface controls 54-60. In the example shown, the interface includes a sequence of buttons 54a-d for translating (or scrolling) the continuous image in a forward or backward direction. A "Back" button 54a may scroll the continuous image 46 in a backward direction to display a previous panel 50a. Similarly, a "Next" button 54b may scroll the continuous image 46 in a forward direction to display a subsequent panel 50c of the continuous image. A "Reset" button 54c may return to the beginning of the continuous image 46, which may represent the beginning of the visual narrative.

The interface 44 may also include a "Play" button 54d for initiating automatic scrolling of the continuous image 46. When automatic scrolling is initiated, the application program 18 (FIG. 1) may automatically scroll the continuous image 46 at a predetermined speed. The interface 44 may also include a slider mechanism 56 for selecting the speed in which the application program 18 automatically scrolls the continuous image 46. In the example shown, the slider mechanism 56 is configured such that the left half of the slider specifies a backward scrolling speed and the right half of the slider specifies a forward scrolling speed. Each notch 56a of the slider mechanism 56 may specify a particular scrolling speed. A maximum forward or backward scrolling speed may be selected by positioning the indicator 56b at the rightmost or leftmost notch respectively. The center notch 56c of the slider 56, in the example shown, may correspond to a scrolling speed of zero in which automatic scrolling of the continuous image 46 is paused.

The interface 44, in the example shown, also includes a scrollbar 58 that may be used to control the portion of the continuous image 46 displayed in the display window 52. Moving the thumb 58a of the scrollbar 58 along the track 58b may respectively scroll the continuous image 46 in the display window 52. The position of the thumb 58a of the scrollbar 58 may correspond to the position of the continuous image 46 in the display window 52. For example, when the thumb 58a of the scrollbar 58 is positioned near the beginning, middle, or end of the track 58b, the respective beginning, middle, or end of the continuous image 46 may be displayed in the display window 52.

Another interface control may enable the viewer to directly manipulate the continuous image 46 in the display window 52. The interface 44 may also include a pointer 60 that allows a viewer to grab the continuous image 46 and scroll the continuous image based on the movement of the pointer. The pointer 60 may be controlled by an external peripheral (not shown) coupled to the display device 22 (FIG. 1) such as, for example, a mouse, trackball, joystick, touchpad, stylus, and the like. The display module 34 may also update the portion of the continuous image 46 presented at the display window 52 in response to various keystrokes at an keyboard coupled to the computing device 12. The display device 22 itself may even include a touchscreen allowing viewers to manually scroll the continuous image 46 with their fingers.

The interface 44 described above may be provided by the display module 34 (FIG. 1) of the application program 18. The display module 34 may, for example, set up and present the interface 44, display the individual images 20 as a continuous image 46, and respond to interface control events. For example, the display module 34 may scroll and update the portion of the continuous image 46 presented at the display window 52 in response to actuation of one of the interface controls 54-60 described above. A smooth and fluid scrolling of the continuous image 46 may be provided by program code embodied in the application program 18 and/or referenced by the application program. For example, movement and scrolling of the continuous image 46 may be provided by the "Tweener" software package (caurina.transitions.Tweener) may be available at the URL address of http://code.google-.com/p/tweener/. Those skilled in the art will recognize that additional an alternative interface controls used to manipulate the continuous image 46 may be selectively employed.

Figure 3A:
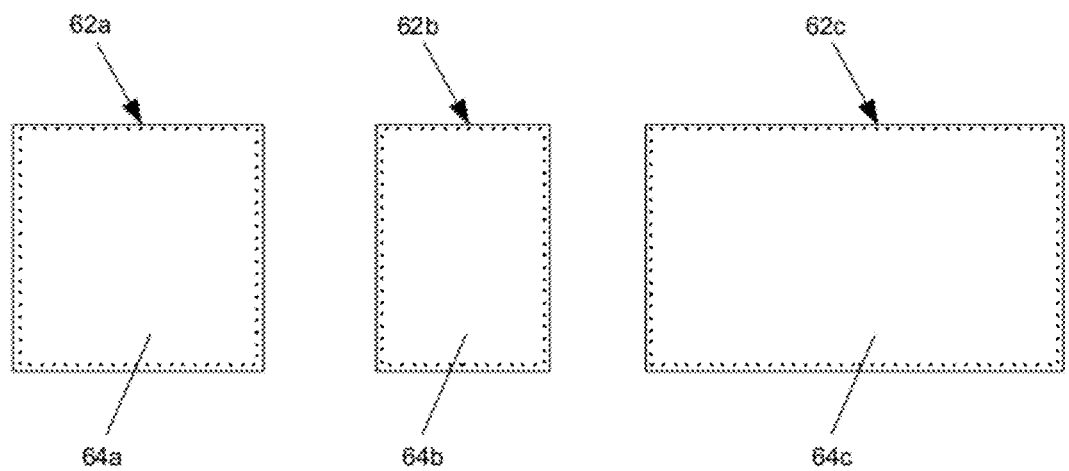
FIG. 3A is a set of three images that may be displayed as a continuous image.

Referring now to FIG. 3A, a set of three images 62a-c that may be displayed as a continuous image is shown. Each image 62a-c includes a respective panel 64a-c for displaying content such as, for example, a scene of a visual narrative. The content of the panels 64a-c may be embodied as image data of the respective images 62a-c. As discussed above, the system described herein displays individual images as a continuous image to present a visual narrative on a display device. Accordingly, to achieve a seamless flow from one image to the next as well as from one panel to the next, a transition 72a-b (FIGS. 3D-G) may be positioned between or within the example images 62a-c and/or example panels 64a-c.

Figure 3B:
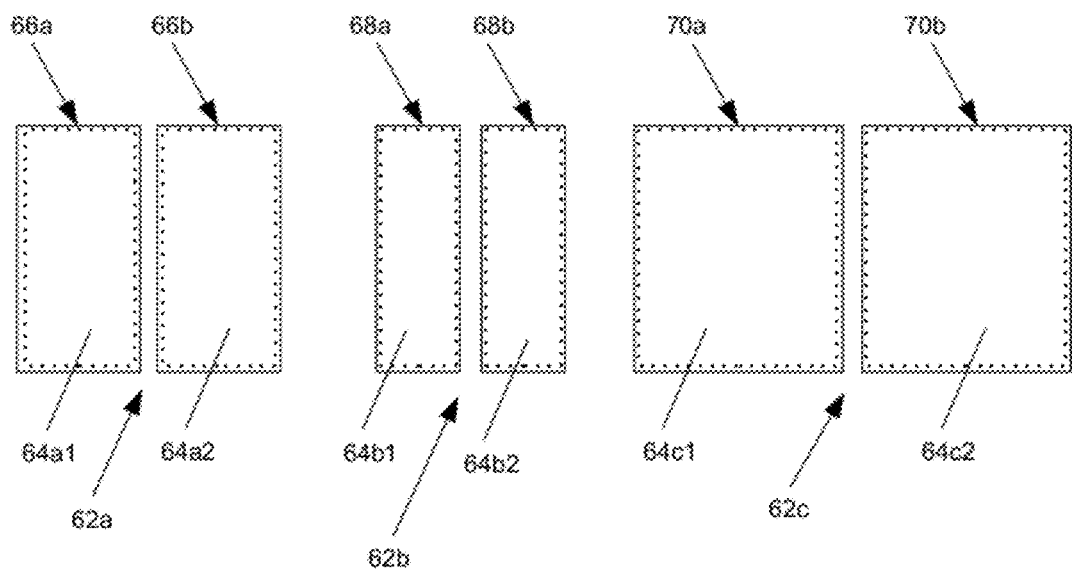
FIG. 3B is the set of images of FIG. 3A wherein each image is split into a first sub-image and a second sub-image.

In order to determine where transitions should be placed, an ordered arrangement for the images may be specified. For example, in the example shown, a first image 62a, second image 62b, and third image 62c are shown in sequence representing the order in which the images would be displayed as a continuous image. The images 62a-c may then be divided into respective sub-images 66a-b, 68a-b, 70a-b representing a first half and second half for each image as shown in FIG. 3B. As seen in FIG. 3B, the first image 62a is split into a first image half 66a and a second image half 66b. Similarly, the second image 62b and third image 62c are also split into a first image half 66a, 70a and a second image half 66b, 70b respectively. Splitting the images in half also splits the panels 64a1-2, 64b1-2, 64c1-2 of each image in half as well. Each image half may be stored as a new image file in the storage module and/or memory of the system. Splitting the images 62a-c into sub-images 66a-b, 68a-b, 70a-b helps to determine where transitions may be positioned to display the individual images as a seamless, continuous image.

Figure 3C:
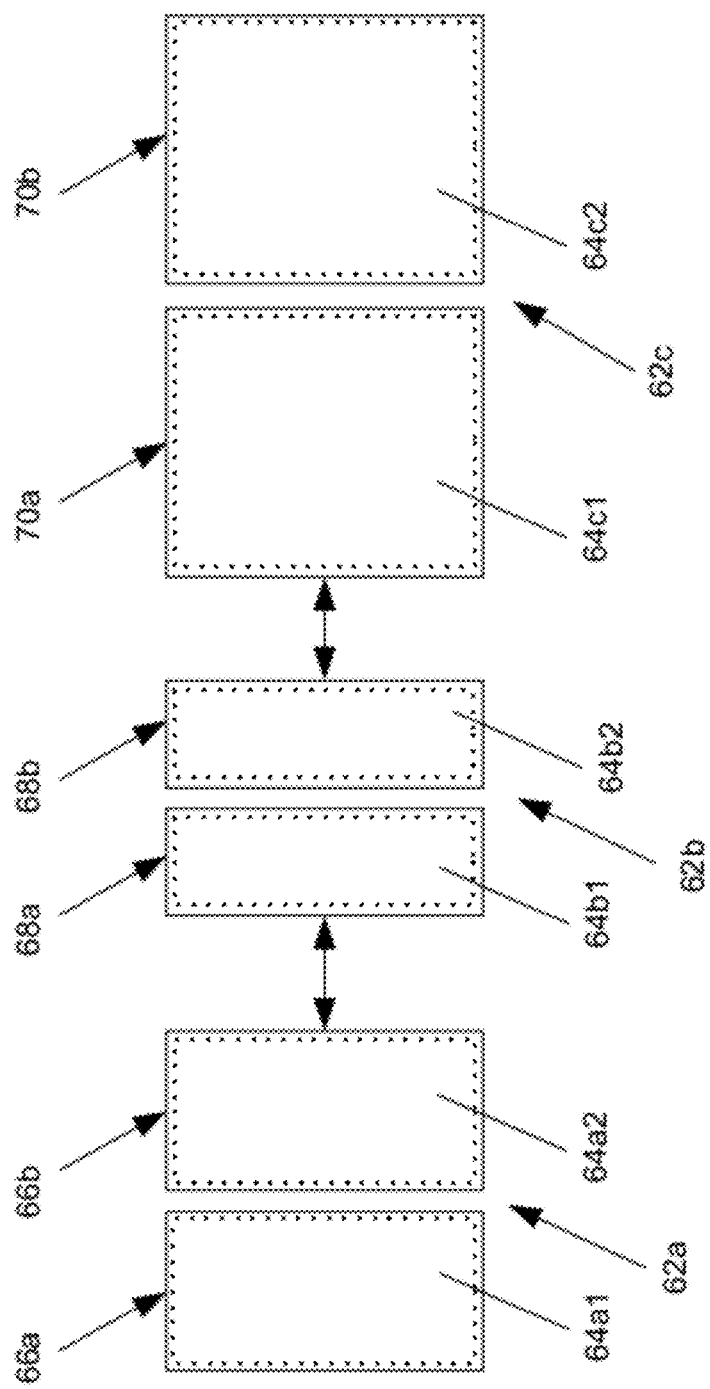
FIG. 3C is the set of sub-images of FIG. 3B illustrating a pairing of adjacent sub-images.

As shown in FIG. 3C, the second half of one image may be paired with the first half of a subsequent image in order to determine where a transition may be positioned between the image halves. In the example shown, the second half 66b of the first image 62a is paired with the first half 68a of the second image 62b. Likewise, the second half 68b of the second image 62b is paired with the first half 70a of the third image 62c.

Figure 3D:
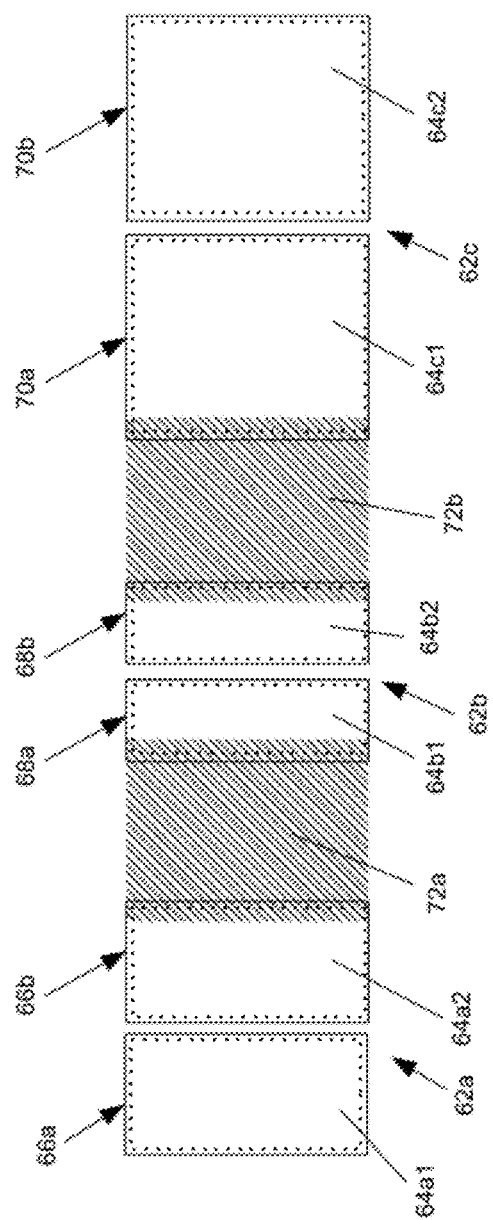
FIG. 3D is the set of paired sub-images illustrating a transition positioned between each sub-image pair.

As shown in FIG. 3D, transitions 72a-b may be respectively positioned between the image pairings to provide a seamless flow from one image to another. The transition 72a between the second half 66b of the first image 62a and the first half 68a of the second image 62b functions to provide a seamless flow between the first image and the second image. Similarly, the transition 72b between the second half 68b of the second image 62b and the first half 70a of the third image 62c functions to provide a seamless flow between the second image and the third image.

Figure 3E:
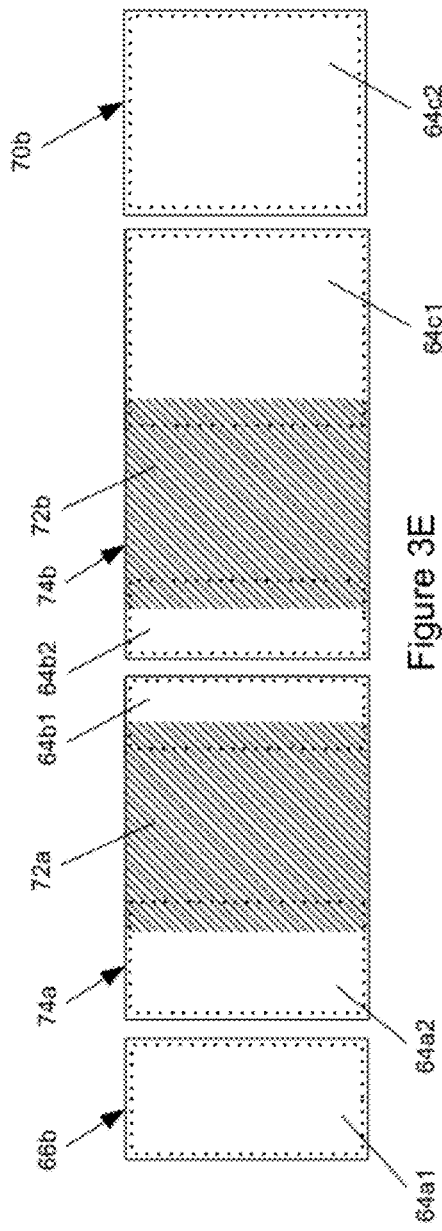
FIG. 3E is a set of two images formed by respectively combining the paired sub-images and respective transitions of FIG. 3D.

Referring now to FIG. 3E, two merged images 74a-b are shown. The merged images 74a-b are formed by respectively combining the paired images 66b-68a, 68b-70a and respective transitions 72a-b of FIG. 3D. As seen in FIG. 3E, the first merged image 74a includes right half panel 64a2 of the first image 62a, the transition 72a, and the left half panel 64b1 of the second image 62b thus providing a seamless flow from the end of the first image into the beginning of the second image. In a similar fashion, the second merged image 74b includes the right half panel 64b2 of the second image 62b and the left half panel 64c1 of the third image 62c also providing a seamless flow from the end of the second image into the beginning of the third image.

Figure 3F:
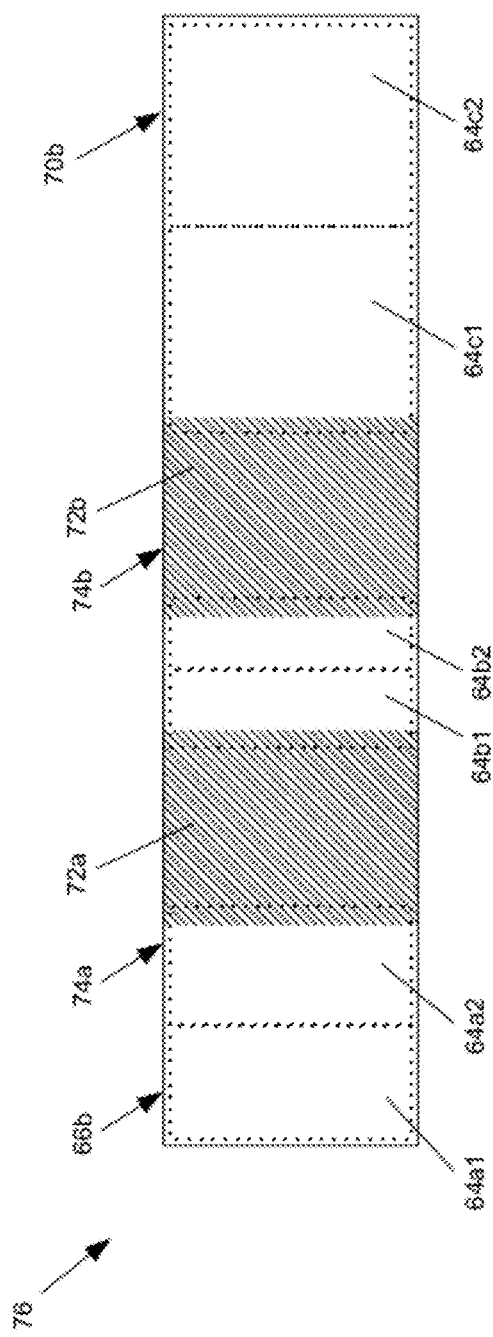
FIG. 3F is a continuous image constructed from the sub-images of FIG. 3B and the combined mages of FIG. 3E.

As seen in FIG. 3F, when the individual images 62a-c (FIG. 3A) are displayed as a continuous image 76, the transitions 72a-b provide a seamless flow across the panels 64a-c of the individual images. As a result, the visual narrative may be displayed as one elongate, continuous image 76. The example continuous image discussed above with reference to FIGS. 3A-F is configured for presentation and scrolling in a horizontal direction. Individual images may alternatively include transitions and configurations adapted for presentation and scrolling in a vertical direction as well.

Figure 3G:
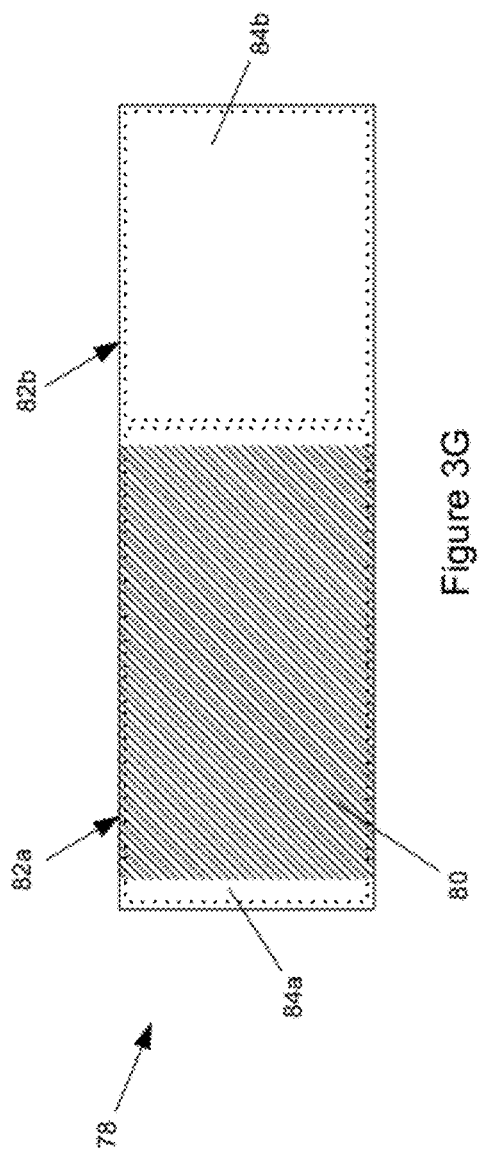
FIG. 3G is an image having a transition incorporated into the panel of the image.

Referring now to FIG. 3G, a continuous image 78 is shown illustrating an alternative function of a transition 80 that is incorporated into an image 82a adjacent to another image 82b. As discussed above, transitions may function to provide a seamless flow from one individual image to a subsequent individual image when the images are displayed as a continuous image. Alternatively, the transition may also function distinguish between panels of adjacent images. For example, panels may represent different scenes or ideas of a visual narrative. When presenting a visual narrative as a continuous image, it may be beneficial to distinguish between panels, i.e., where one scene or idea ends and the next scene or idea begins.

Accordingly, as shown by way of example in FIG. 3G, a transition 80 may also be embodied in the panel of an image to distinguish the panel 84a from the subsequent panel 84b. As shown in FIG. 3G, the transition 80 is incorporated into the panel 84a of the first image 82a rather than positioned between the panel of the first image and the panel 84b of the second image 82b of the continuous image 78. Thus, in this example, the transition 80 functions to distinguish the panel 84a of the first image 82a from the panel 84b of the second image 82b.

Figure 4:
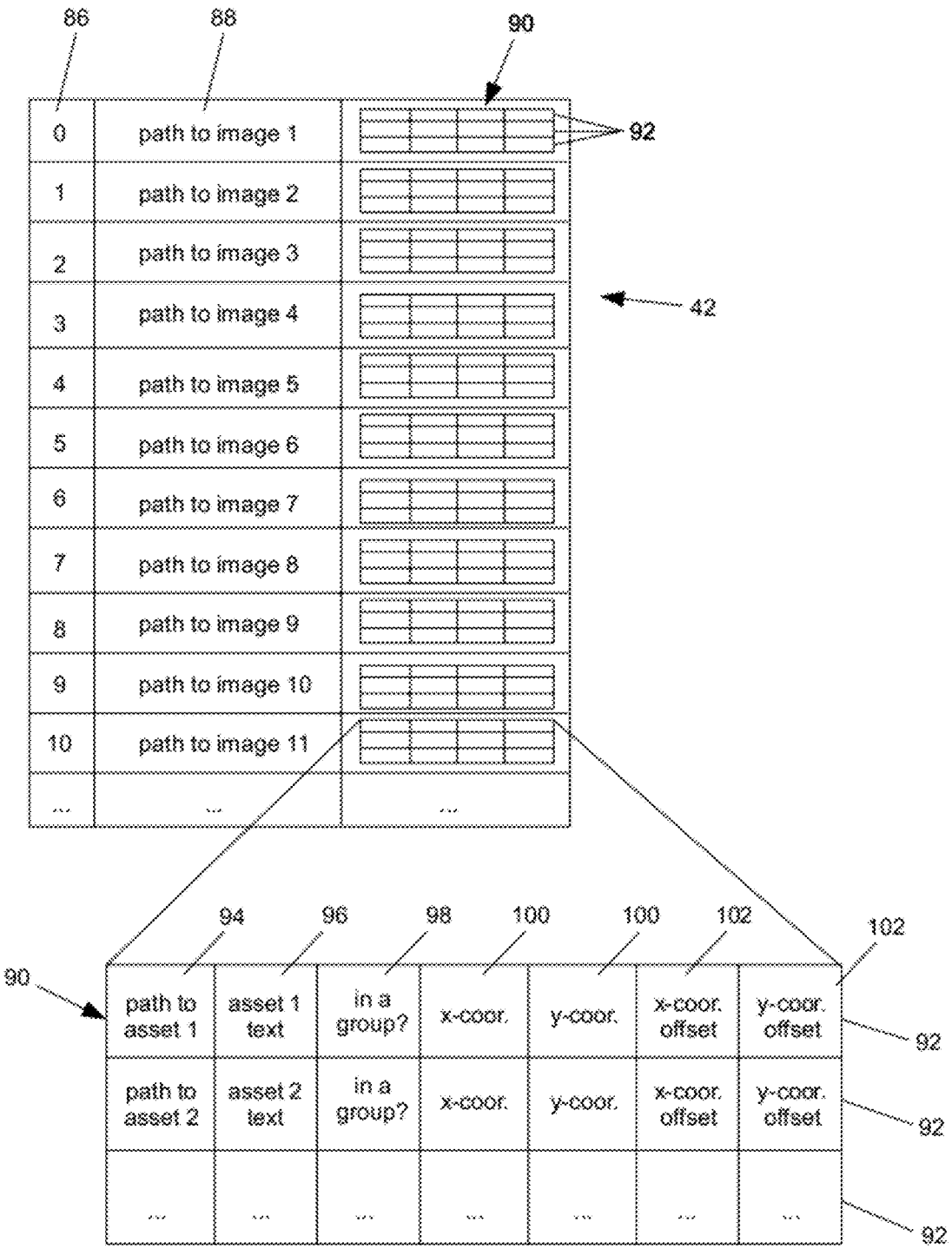
FIG. 4 is a representational illustration of an example sequence listing specifying an order for the individual images.

Referring now to FIG. 4, a representational sequence listing 42 specifying an order for the individual images 20 (FIG. 1) is shown. As discussed above with reference to FIG. 1, the sequence listing 42 may be stored in a memory 16 at a computing device 12 and/or stored at a storage module 24 of a host 26 and transmitted to a client computing device across a network 28. The sequence listing 42 may be, for example, an Extensible Markup Language (XML) document having tag and element data that specify an ordered sequence for the individual images 20.

The sequence listing 42, in the example shown, includes: the position 86 of an individual image when displayed in a continuous image; the path 88 to where the image is stored in the storage module 24 or the memory 16 of the computing device 12; and a set of information 90 relating to assets 92 associated with an individual image.

Assets 92 may be, for example, supplemental images associated with an individual image. Generally, assets 92 may include variations in background or foreground elements that do not alter the content of the visual narrative (FIG. 6B). As discussed further below, assets 92 as supplemental image data may be superimposed on an individual image when the individual image is displayed in a continuous image. Further, a superimposed asset 92 on a corresponding image may be selectable with the pointing device 60 (FIG. 2) of the interface 44. Selecting the asset 92 may execute a task at the computing device 12. The superimposition of assets 92 and the execution of tasks will be discussed in further detail below with reference to the supplemental image processor 32, randomizer 38, and the task executor 40 (FIG. 1).

Still referring to FIG. 4, the asset information 90 may include: the path 94 to where the asset 92 is stored on in the storage module 24 or the memory 16 of the computing device 12; textual data 96 associated with the asset; a flag value 98 indicating whether the asset is part of a group; the x-y coordinate position 100 of the asset relative to the corresponding individual image; and x-y coordinate offset values 102.

The textual data 96 associated with the asset 92 may be, for example, the URL for a website. A task executor 40 may instruct the computing device 12 to navigate to the website at the corresponding URL when a user selects the asset 92, as discussed further below. The group flag value 98 may be used to indicate that the asset 92 is a member of an asset group. As discussed further below, a randomizer 38 may randomly select an asset 92 from the group for superimposition on the corresponding image.

The x-y coordinate position 100 specifies the location of the asset 92 relative to the corresponding individual image. For example, consider an image 500 pixels wide and 400 pixels high and an asset image 92 having an x-y coordinate position 100 of (225, 175). The asset image 92 may thus be located at the (225, 275) coordinate position of the corresponding image when superimposed on the corresponding image. The x-y coordinate offset values 102 may represent an acceptable range within which the asset 92 may be offset from the specified x-y coordinate position 100 when superimposed on the corresponding image. Continuing with the example above, consider the asset image 92 with an x-y coordinate position 100 of (225, 175) and an x-y offset values 102 of 10 pixels and 20 pixels respectively. Accordingly, the asset image 92 may be positioned at an x-coordinate position ranging between 215 pixels and 235 pixels of the corresponding image. Similarly, the asset image 92 may be positioned at a y-coordinate position ranging between 155 pixels and 195 pixels of the corresponding image. The randomizer 38 may also select a randomized x-y coordinate position 100 based on the x-y coordinate range as discussed further below.

An example sequence listing 42 as an XML document is shown below:

```
<?xml version="1.0" encoding="utf-8"?>
<movie_xml>
    <name><![CDATA[my_long_comic]]></name>
    <image>
        <jpg>
            <jpg_path><![CDATA[/image1.jpg]]></jpg_path>
        </jpg>
    </image>
    <image>
        <jpg>
            <jpg_path><![CDATA[/image2.jpg]]></jpg_path>
        </jpg>
        <png>
            <png_path><![CDATA[/asset1.png]]></png_path>
            <item_txt><![CDATA[website.com]]></item_txt>
            <is_group><![CDATA[NO]]></is_group>
            <png_x><![CDATA[225]]></png_x>
            <png_y><![CDATA[175]]></png_y>
            <offset_x><!CDATA[10]]><offset_x>
            <offset_y><!CDATA[20]]></offset_y>
        </png>
    </image>
</movie_xml>
```

Those skilled in the art will recognize that alternative means of specifying and identifying an order for the individual images may be selectively employed. For example, the order for the individual images may be embodied in the file names of the images themselves (e.g., image1.jpg, image2.jpg, etc.) rather than stored in a sequence listing document such as an XML file. Additionally, other types of digital files may be selectively employed for the sequence listing document, and the sequence listing document may include additional or alternative information relating to the individual images or assets.

The parser 30 (FIG. 1) of the application program will now be discussed with reference to FIGS. 4-5. The parser 30 may process and analyze the sequence listing 42 to extract the order for the individual images 20 that will be displayed as a continuous image. For example, the parser 30 may iteratively extract the information (image file path 88, asset file path 94, x-y coordinates 100, etc.) from the example XML document.

As the parser 30 parses and processes the sequence listing 42, an image processor 32 may retrieve the image at the specified file path 88 and store the image data 104 of the image in an image container 106. For example, implementations of the application program on the Adobe Flash platform may store the image data 104 in a MovieClip object, which is adapted to display image data. The image processor 32 may then store the image containers 106 in a collection 108 according to the specified order. As seen in FIG. 5, the collection 108 may be, for example, an array object with each cell 110 of the array storing an image container 106 containing the image data 104 of an individual image. As discussed further below, the display module 34 of the application program 18 uses the image data array 108 to display the individual images as a continuous image.

Figure 5:
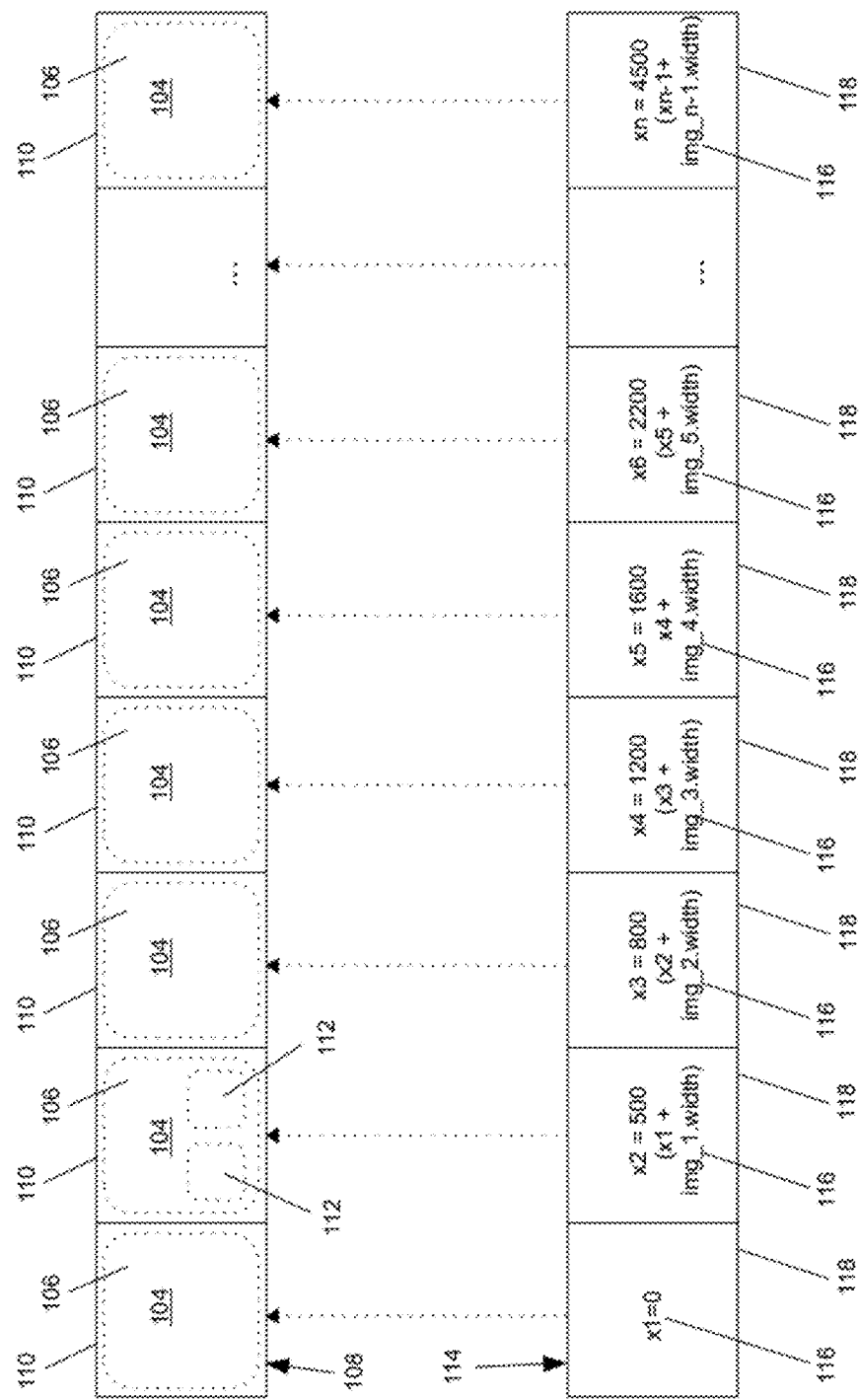
FIG. 5 is a representational illustration of an image container and image position container for the individual images.

As seen in FIG. 5, the sequence of image containers 106 in the image data array 108 corresponds to the specified order in the sequence listing 42. The first image container 106 in the image data array 108 stores the image data 104 for the first image in the ordered sequence. Likewise, the subsequent image containers 106 contain the image data 104 for the second image, third image, etc. of the images according to the order parsed from the sequence listing 42. Thus, the last image container 106 in the image data array 108 contains the image data 104 for the last image that will be displayed when the images are displayed as a continuous image.

Further, the image containers 106 may include the image data 112 for assets 92 that may be associated with an individual image. As discussed above, an asset 92 may be, for example, a supplemental image having supplemental image data 112 to be superimposed on the corresponding individual image. Also mentioned above, one or more assets 92 may be associated with an individual image. The assets 92 may include a file path 94 to the asset, x-y position coordinates 100, and may be assigned to a group. A supplemental image processor 36 may retrieve an asset image 92 at the specified file path 94. The supplemental image processor may then add the image data 112 of the asset 92 to the image container 106 for the corresponding individual image so as to superimpose the asset on the corresponding image. The supplemental image processor 36 may add the supplemental image data 112 to the image container 106 at the x-y position 100 of the corresponding image. Accordingly, the supplemental images 92 are displayed at the x-y positions 100 of the respective corresponding images 48b-c as shown in FIG. 6.

As mentioned above, a randomizer 38 may randomize the selection and positioning of assets 92 associated with an individual image. For example, where three grouped assets 92 are associated with an individual image, the randomizer 38 may randomly select the second asset 92 for superimposition on the corresponding image. Also mentioned above, where an asset 92 includes position offset values 102, the randomizer 38 may calculate randomized position coordinates within the offset range. Using the example discussed above—an asset 92 having an x-coordinate offset range of 215-235 pixels and a y-coordinate offset range of 155-195 pixels—the randomizer 38 may randomly select the x-y coordinate position 100 for the asset as (222, 167).

Still referring to FIGS. 4-5, the display module 34 may also maintain a collection 114 that identifies the appropriate position 116 for each individual image when displayed as a continuous image. Like the collection 108 of image containers 106, the collection 114 of image positions 116 may also be an array object. As the parser 30 parses and processes the sequence listing 42, the positions 116 for the individual images when presented at the display window 52 may be calculated and added to the image position array 114. In the example shown, the position 116 for each individual image in the display window 52 is an x-axis coordinate value that is based on the width of the preceding image. The first image of the continuous image may be given a position coordinate 116 of zero since no other image precedes the first image. Subsequent to the first image, the position 116 may be determined by adding the preceding position to the width of the preceding image. Thus, the beginning of each individual image may be positioned at the location where the preceding image ends thereby providing a contiguous and continuous image.

In the case of the second image in the example shown, the position 116 for the second image may be determined by adding zero to the width of the first image. By way of example, if the width of the first image is 500 pixels, then the position for the second image is calculated to be 500 (0+500=500). Continuing the example, if the width of the second image is 300 pixels, then the position 116 for the third image is calculated to be the sum of the position of the second image and the width of the second image, i.e., 800 (500+ 300=800). Thus, the position values 116 in each cell 118 of the image position array 114 correspond to the image data 104 in a corresponding cell 110 of the image data array 108, as shown in FIG. 5.

The display module 34 may use the image position array 108 to keep track of the image array cell 110 having the image data 104 for the currently displayed image 48b at the display window 52 (FIG. 2). A coordinate position may also be associated with the display window 52 identifying the position of the continuous image currently displayed. For example, consider a continuous image having a sum total width of 5000 pixels. If the display window 52 is, for example, 1000 pixels wide and the coordinate position of the display window is 1277, then the display window would display a portion of the continuous image starting at pixel 1277 and ending at pixel 1377 of the continuous image.

When the continuous image is scrolled, the display module 52 may update the display window position. As mentioned above, the application program 18 may be set to automatically scroll the continuous image. The display module 34 of the application program 18 may perform the automatic scrolling of the continuous image by periodically updating the coordinate position of the display window 52. For example, in order to automatically scroll a horizontal continuous image, the display module 52 may add 5 to the coordinate position of the display window 52 every second. Faster speeds may be achieved by adding larger values to the coordinate position of the display window. Alternatively, the interface controls 54-60 (FIG. 2) may be used to update the position of the display window in response to input at the interface controls. For example, clicking the "Next" button 54b may advance the continuous image by 500 pixels. Accordingly, clicking the "Next" button 54b may add 500 to the coordinate position of the display window.

To determine which cell 110 in the image data array 108 holds the image data 104 for the image that should be displayed at the display window 52, the display module 34 may iteratively compare the position of the display window 52 to the image positions 116 in the image position array 114. The array cell 118 for the image that should be displayed is the array cell whose position value 116 is greater than or equal to the position of the display window 52 and where the position value of the subsequent array cell is less than the position of the display window. For example, in FIG. 5, the position 116 in the third array cell 118 is x3=500, and the position in the fourth array cell is x4=1200. If the position of the display window 52 is x=842, then the position of the display window is greater than the position x3 118 of the third array cell and less than the position x4 118 of the fourth array cell. Thus, the image data for the image that should be displayed at the display window 52 is contained in the image container 106 of the third cell 110 in the image data array 108. As the continuous image is scrolled towards the subsequent image, the position of the display window 52 will eventually move into the range of the fourth cell 116 in the image position array 114 and the display window may display the image data 104 from the fourth cell 110 in the image data array 108.

As mentioned above, the display module 34 may use a "tweener" software package to smoothly scroll between images. Continuing the example of the preceding paragraph, the display module 34 may create a "tween" for the third and fourth image to achieve the smooth scrolling effect between the images. With reference to the components of the application program discussed above, those skilled in the art will recognize that additional or alternative component, data structures, and/or data objects may selectively be employed.

Figure 6A:
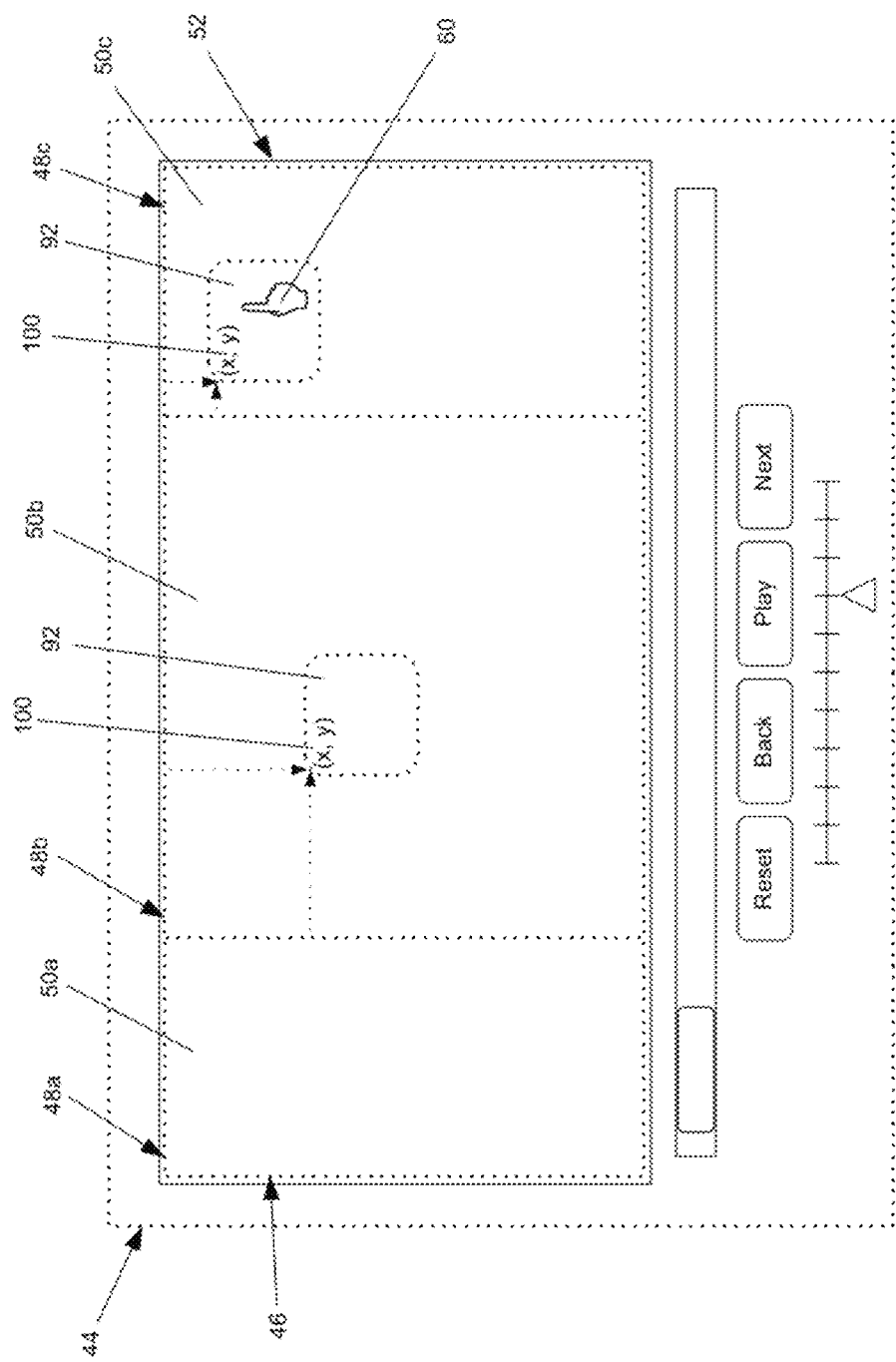
FIG. 6A is a representational illustration of supplemental images overlaid atop a portion of a continuous image presented on an example display interface.
Figure 6B:
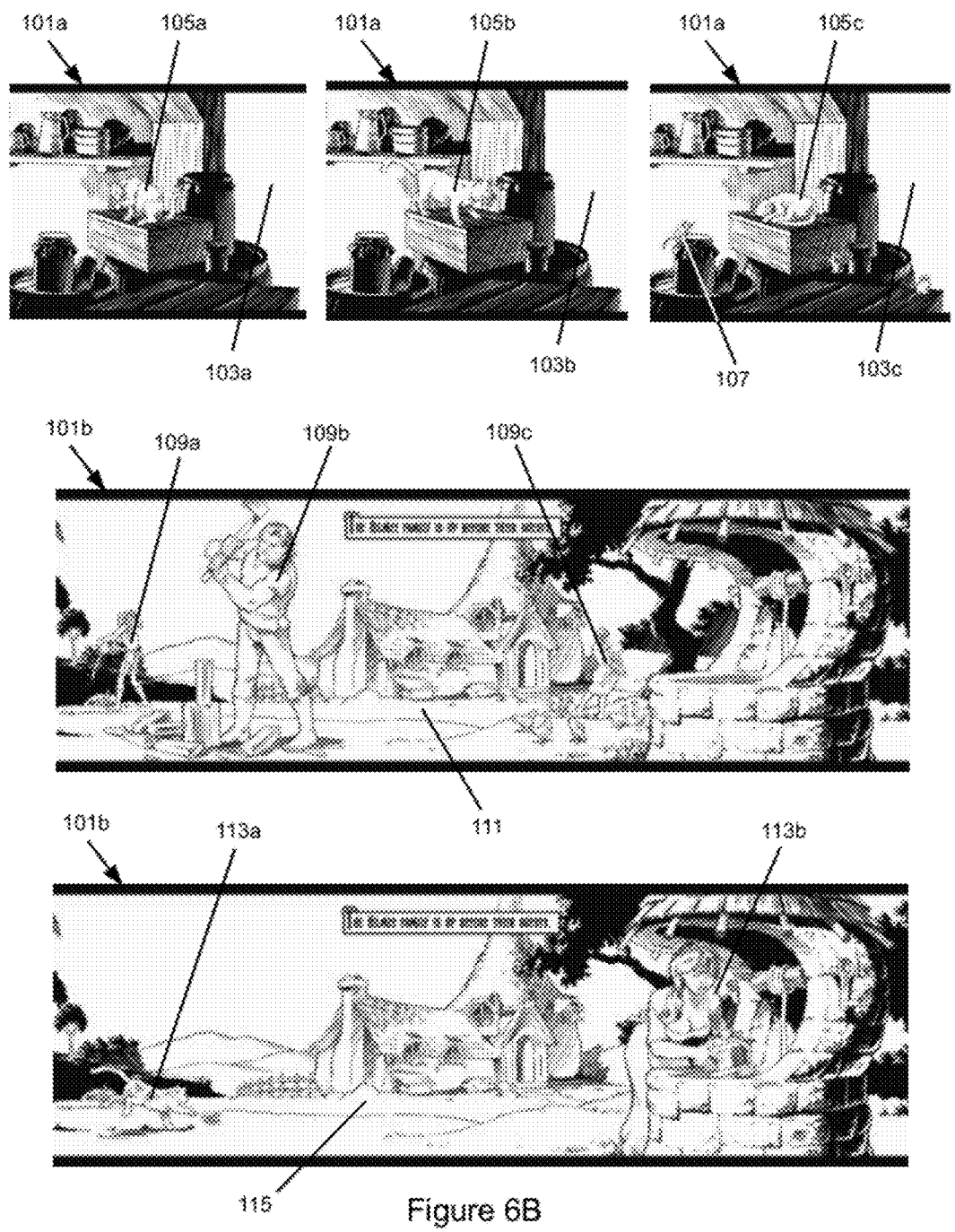
FIG. 6B is an example of two sets of image panels having random supplemental images overlaid the image.

Referring now to FIG. 6A, an interface 44 is shown illustrating a display window 52 displaying a portion of a continuous image 46 having selectable assets 92 superimposed thereon at randomized x-y positions 100. As shown in FIG. 6, an asset 92 may be selectable by the pointer 60 of the interface 44. As mentioned above, selecting an asset 92 may initiate a task carried out by the task executor 40 (FIG. 1). In the example above, a URL address for a web site is associated with the asset 92. Selecting the asset 92 may cause the task executor 40 to instruct the computing device 12 to navigate to the web site at the URL address for the website via, for example, a web browser running at the computing device. Other tasks that may be associated with an asset and carried out by the task executor include: playing music or a sound effect, displaying a dialog window, displaying a text window having a description of the asset, and displaying an alternative version of the asset. Additional or alternative tasks may selectively be associated with selectable asset and carried out by the task executor.

FIG. 6B includes two examples of the randomized selection of assets and grouped assets. FIG. 6B includes images 101a-b. Image 101a illustrates how an asset from a group of assets may be selected for superimposition on the image panel 103a of the image. Assets 105a-c are associated with the image 101a as discussed above. In the example shown, the assets are supplemental image data representing a cat to be superimposed on the image panel 103a-c. In the first instance of the image 101a, the asset 105a has been randomly selected and superimposed on the image panel 103a. Similarly, in the second and third instances of the image 101a, assets 105b-c were randomly selected for respective superimposition on image panels 103b-c. Additionally, in the third instance of the image 101a, an additional asset 107, not appearing the first or second instances of the image, was selected for superimposition on the third instance of the image. As seen in FIG. 6B, the inclusion and positioning of assets 105a-c on the image panels 103a-c can provide a slightly different continuous image each time the continuous image is displayed. As a result, the viewing experience may be enhanced since the continuous image for a particular visual narrative can differ slightly upon each viewing.

The second image 101b further illustrates the feature of a different continuous image for the same visual narrative using two different sets of assets 109a-c, 113a-b. As seen in the first instance of image 101b, the image includes a first set of assets 109a-c selected and positioned on the image panel 111 of the image. The second instance of the image 101b includes a different set of assets 113a-b selected and positioned on the image panel 115 of the image. Thus, as seen from the different instances of the image 101b, the continuous image for the same visual narrative may be altered slightly through the use of assets to provide a unique viewing experience with each subsequent display of the continuous image.

Figure 7A:
FIG. 7A is another example of a set of two images that may be displayed as a continuous image.
Figure 7B:
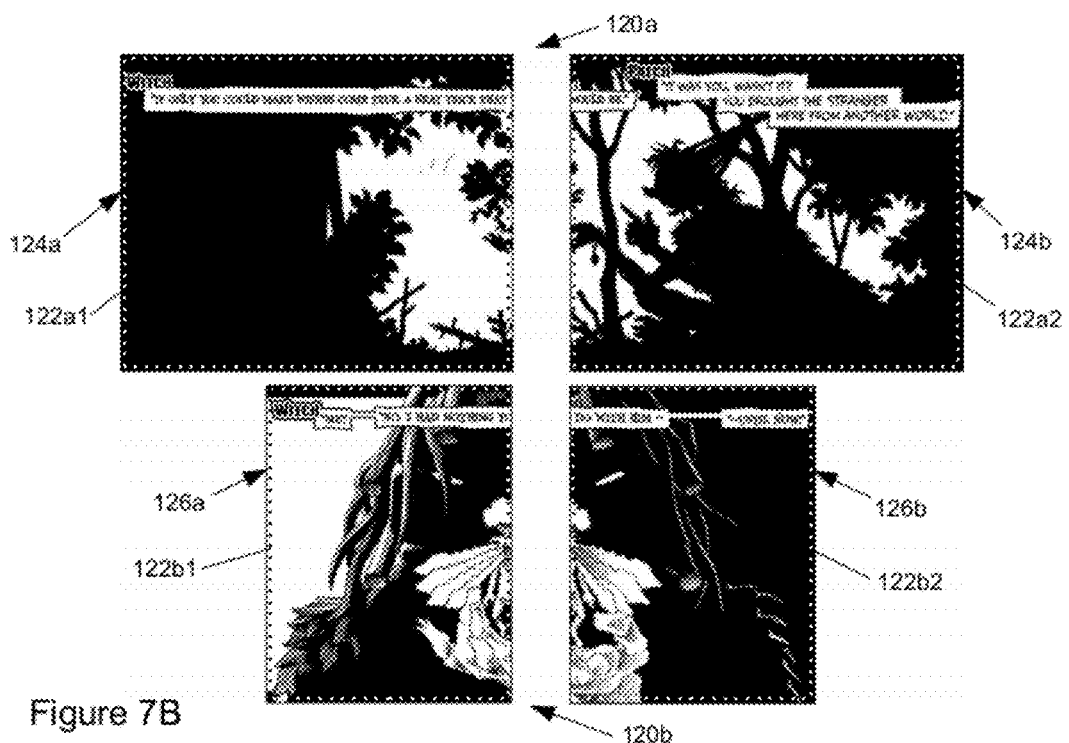
FIG. 7B is the set of images of FIG. 7A wherein each image is split into a first sub-image and a second sub-image.
Figure 7C:
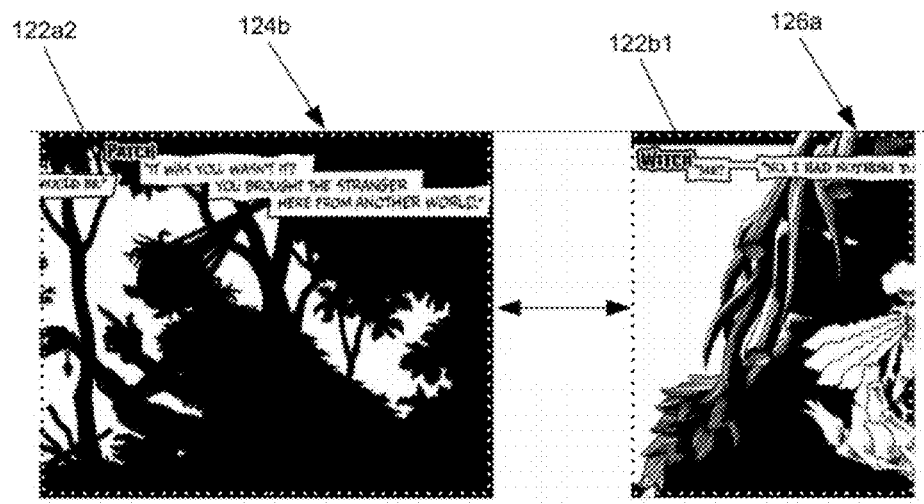
FIG. 7C is the set of sub-images of FIG. 7B illustrating a pairing of adjacent sub-images.

Referring now to FIGS. 7A-D, an example of modifying adjacent images 120a-b of narrative artwork for display as a continuous image is shown. In particular, the first image 120a and the second image 120b of the narrative artwork for display as a continuous image each relate to comic book panels illustrating a scene in a panel 122a-b of the image as shown in FIG. 7A. As discussed above with reference to FIG. 3B, the first image 120a and the second image 120b are each divided into a respective left image half 124a, 126a and a second image half 124b, 126b as seen in FIG. 7B. Accordingly, each image half 124a-b, 126a-b respectively includes half of the panel 122a1-2, 122b1-2 for the image. As shown in FIG. 7C, the second half of the first image is paired with the first half of the second image.

However, as seen in FIG. 7C, the difference in background color of the image panels—black for the first panel 122a2 and white for the second panel 122b1—prevent the images 124b, 126a from being displayed as a seamless, continuous image. The abrupt change from a black background to a white background conspicuously identifies the edges between the two images halves 124b, 126a.

Figure 7D:
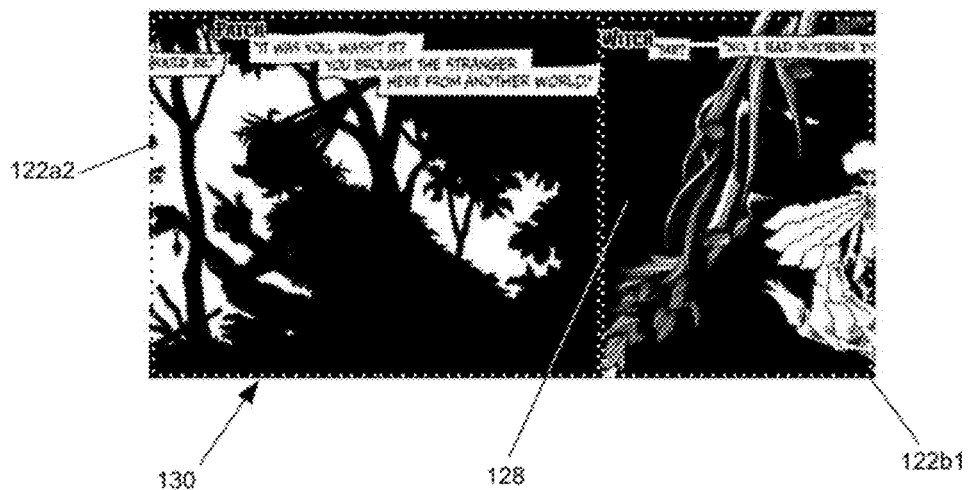
FIG. 7D is an image formed by combining the paired sub-images of 7B and including a transition between the combined sub-images.

A transition 128 may be included with one of the images allowing the images to be displayed as a continuous image 130 as seen in FIG. 7D. The transition 128 may be a set of image data that provides a seamless flow from the first image half 124b to the adjacent second image half 126a. As shown by way of example in FIG. 7D, the transition 128 is a black background applied to the panel 122b1 of the right image half 126a to match the black background of the panel 122a2 of the left image half 124b. FIGS. 7A-D illustrate one example use of a transition. In particular, a transition may function to display a continuous image where the edges between the individual images are no longer discernable.

Alternatively, in addition to obscuring the edges between adjacent images, transitions may be employed to distinguish between different scenes in the panels of adjacent images. The transitions may be embodied as image data in the image files stored in the storage module 24 or memory 16 of the computing device 12. Further, the transitions may be incorporated into the panels of the images or positioned adjacent to the panels of the images. The various types of transitions employed to obscure the edges between images and distinguish between scenes of adjacent panels may constitute a visual grammar. A visual grammar having other types of transitions that may be selectively employed will now be discussed.

Figure 8:
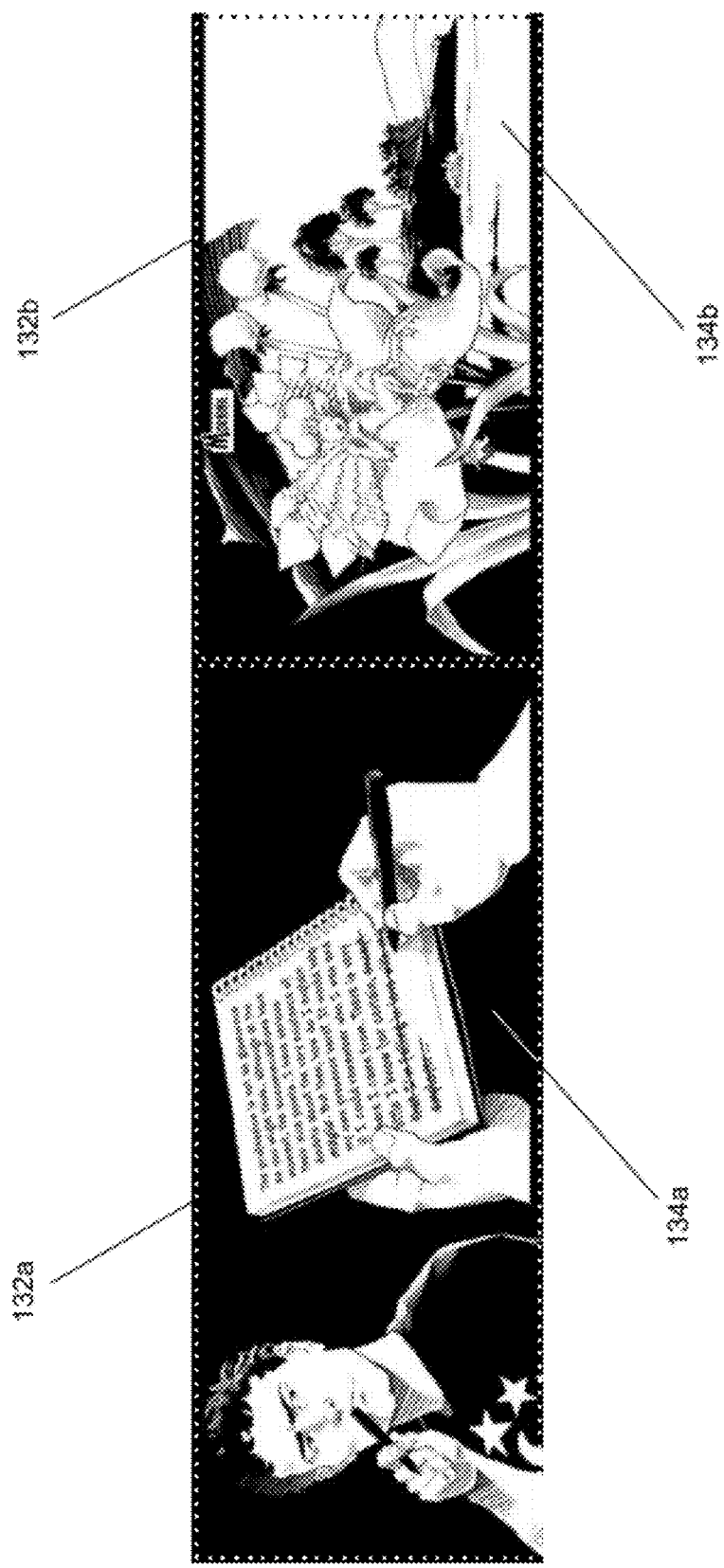
FIG. 8 is a portion of an example continuous image having a transition relating to a change in a color scheme between example images.

A change in color scheme may be used to distinguish scenes of adjacent panels 132a-b as seen in FIG. 8. In the example shown, the color scheme 134a of the first panel 132a is substantially black while the color scheme 134b of the adjacent panel 132b is substantially white. Accordingly, the change in the color schemes 134*a*-*b* from black to white functions to separate and distinguish the scene in the first image panel 132*a* from the scene in the second image panel 132*b*. Thus, a transition of a visual grammar may relate to a change between the color scheme 134*a* of a first image panel 132*a* and the color scheme 134*b* of a second image panel 132*b*. Additional or alternative color schemes may selectively be employed for panels of adjacent images.

Figure 9:
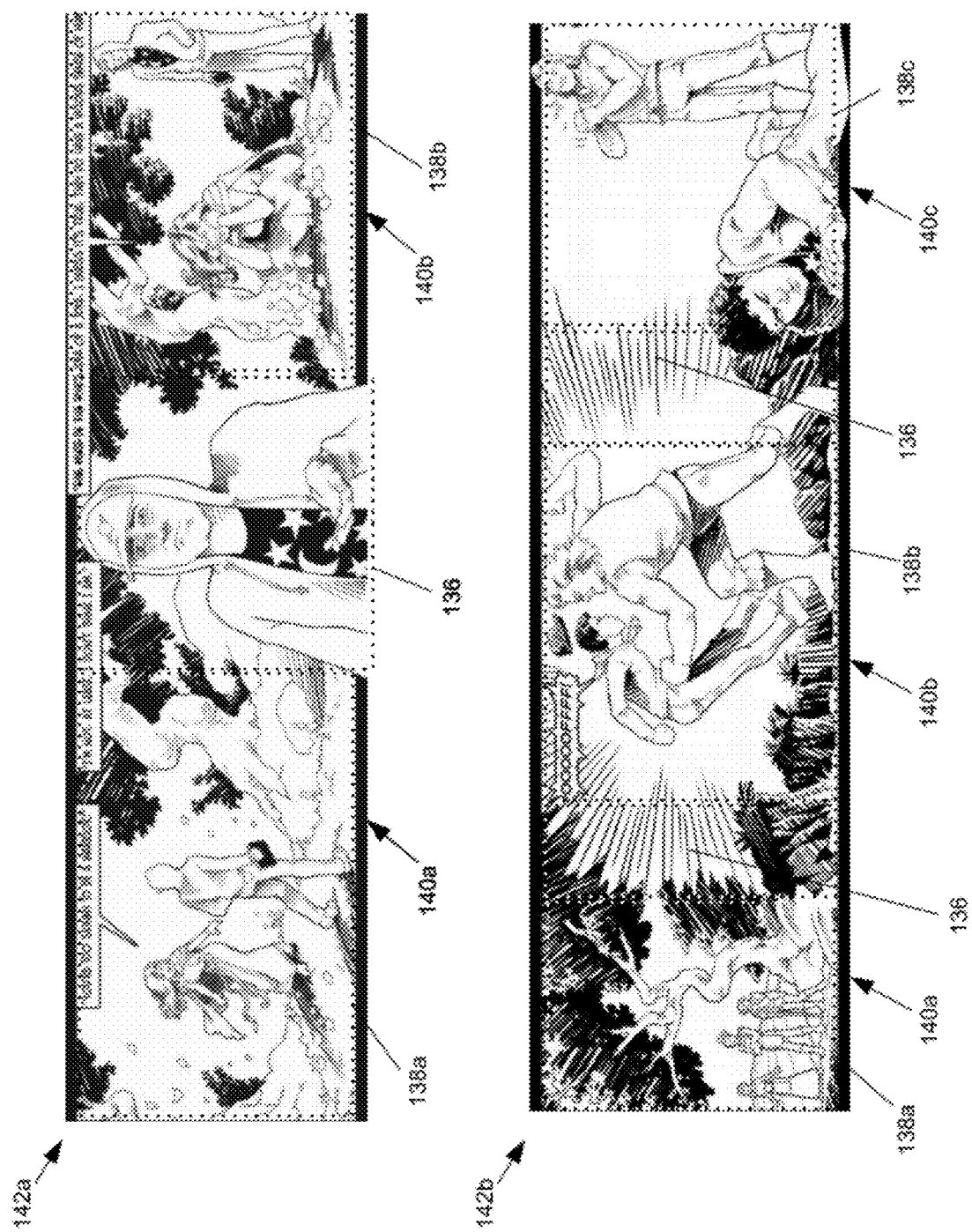
FIG. 9 is a portion of two example continuous images each having a transition relating to a separating element positioned between example images.

Another transition of a visual grammar may be a separating element 136 positioned between the panels 138*a*-*c* of the adjacent images 140*a*-*c* as shown by way of example in FIG. 9. Two types of separating elements 136 are illustrated in the example continuous images 142*a*-*b* of FIG. 9. In the first continuous image 142*a*, a human figure serves as the separating element 136 and, as seen, is positioned between the left panel 138*a* and the right panel 138*b* of the first continuous image. Similarly, in the second continuous image 142*b*, impact lines serve as the separating element 136 between the first panel 138*a* and the second panel 138*b* as well as between the second panel 138*b* and the third panel 138*c*. Those skilled in the art that other figures or objects may be used as separating elements to transition between panels of adjacent images.

Figure 10:
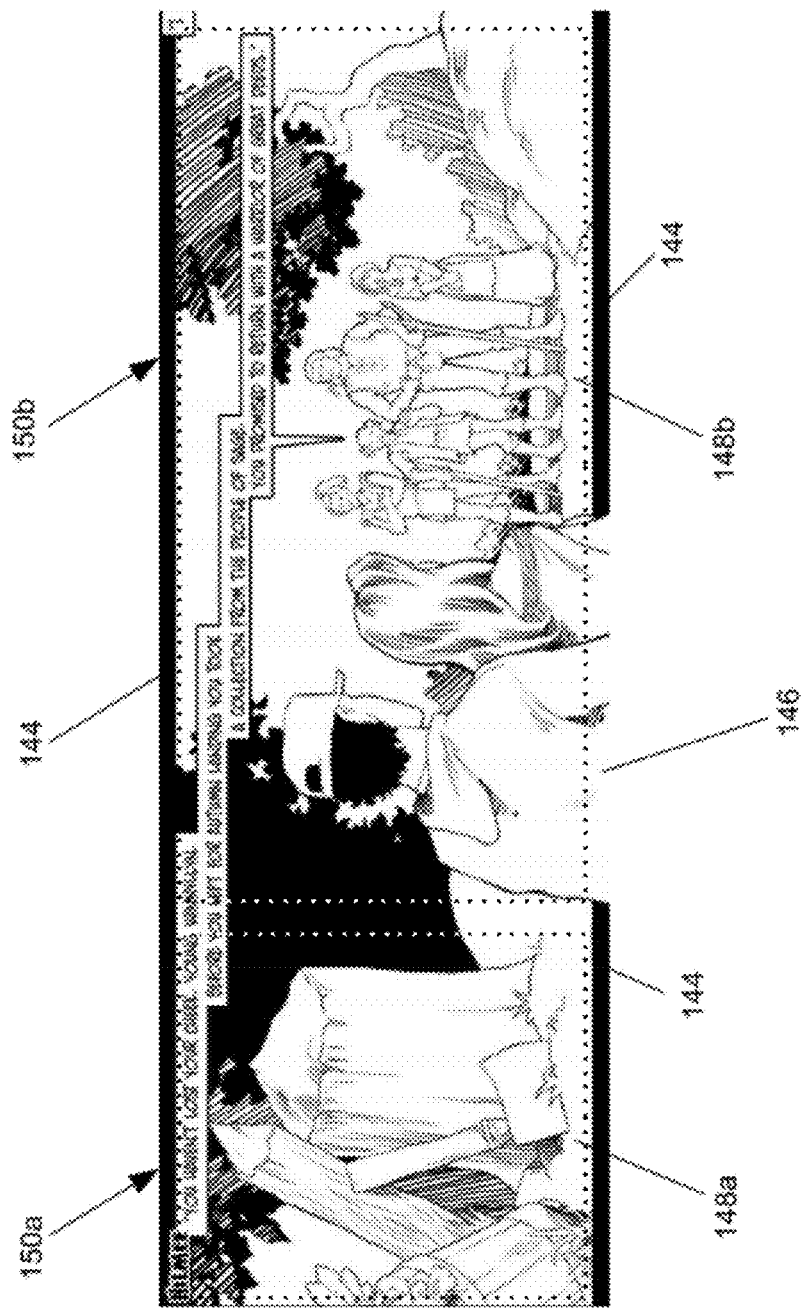
FIG. 10 is a portion of a continuous image having a transition relating to a break positioned in a border between example images.

If the individual images include a top or bottom border 144, as shown in FIG. 10, a transition of a visual grammar may include a break 146 in the top and/or bottom border. In the example shown, the human figures in the scene of the second panel provide a break 146 the bottom border 144 between the panel 148*a* first image 150*a* and the panel 148*b* of the second image 150*b*. Thus, the break in the bottom border distinguishes the scene in the first panel from the scene in the second panel.

Figure 11:
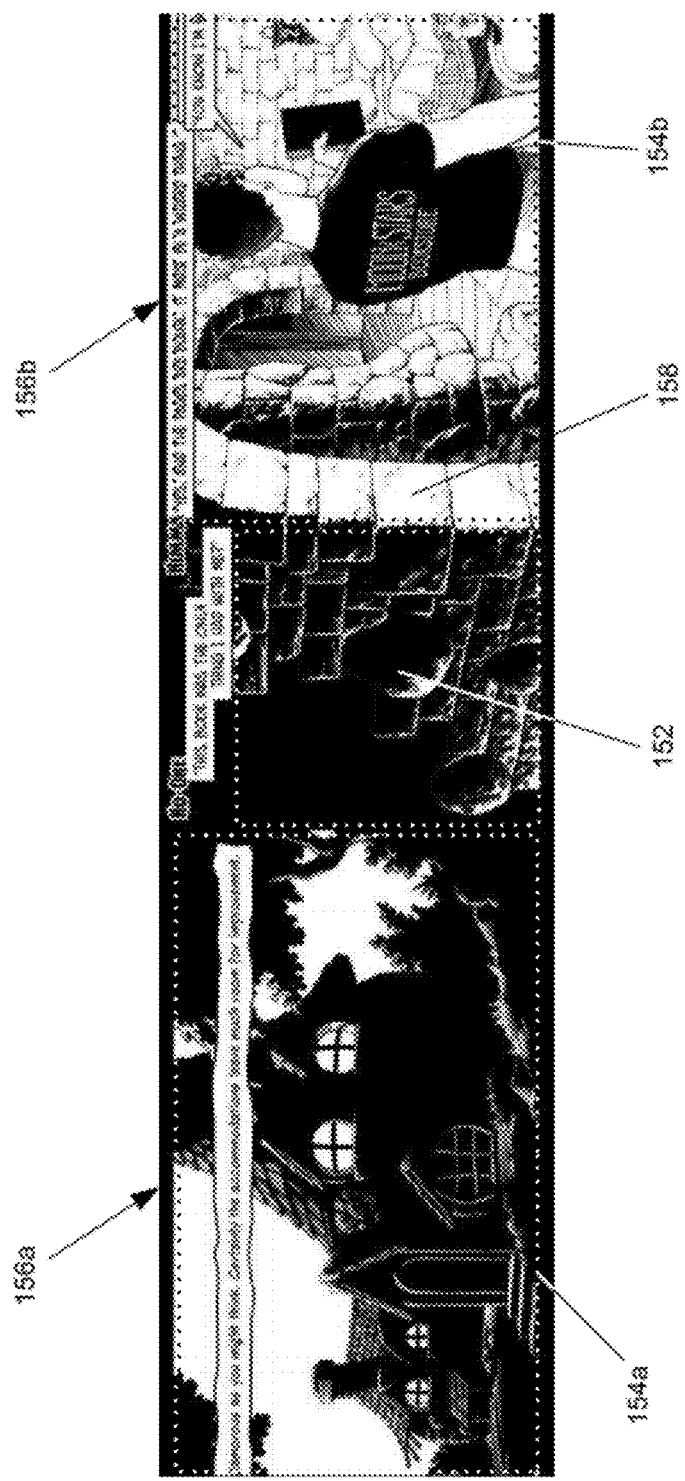
FIG. 11 is a portion of a continuous image having a transition relating to a patterned element positioned between example images.

Further, a transition of a visual grammar may also be a patterned element 152 positioned between the panels 154*a*-*b* of adjacent images 156*a*-*b* as shown by way of example in FIG. 11. As seen in FIG. 11, the patterned element transition 152 is a stone-like texture that flows from the panel 154*a* of the first image 156*a* into the panel 154*b* of the second image 156*b* and meshes with the stone-like structure element 158 of the scene in the panel of the second image. Thus, the transition 152 as a patterned element both obscures the edges between the adjacent images 156*a*-*b* and distinguishes the scene of the first panel 154*a* from the scene of the second panel 154*b*. Those skilled in the art will recognize that other patterns and visual textures may selectively be employed.

Figure 12:
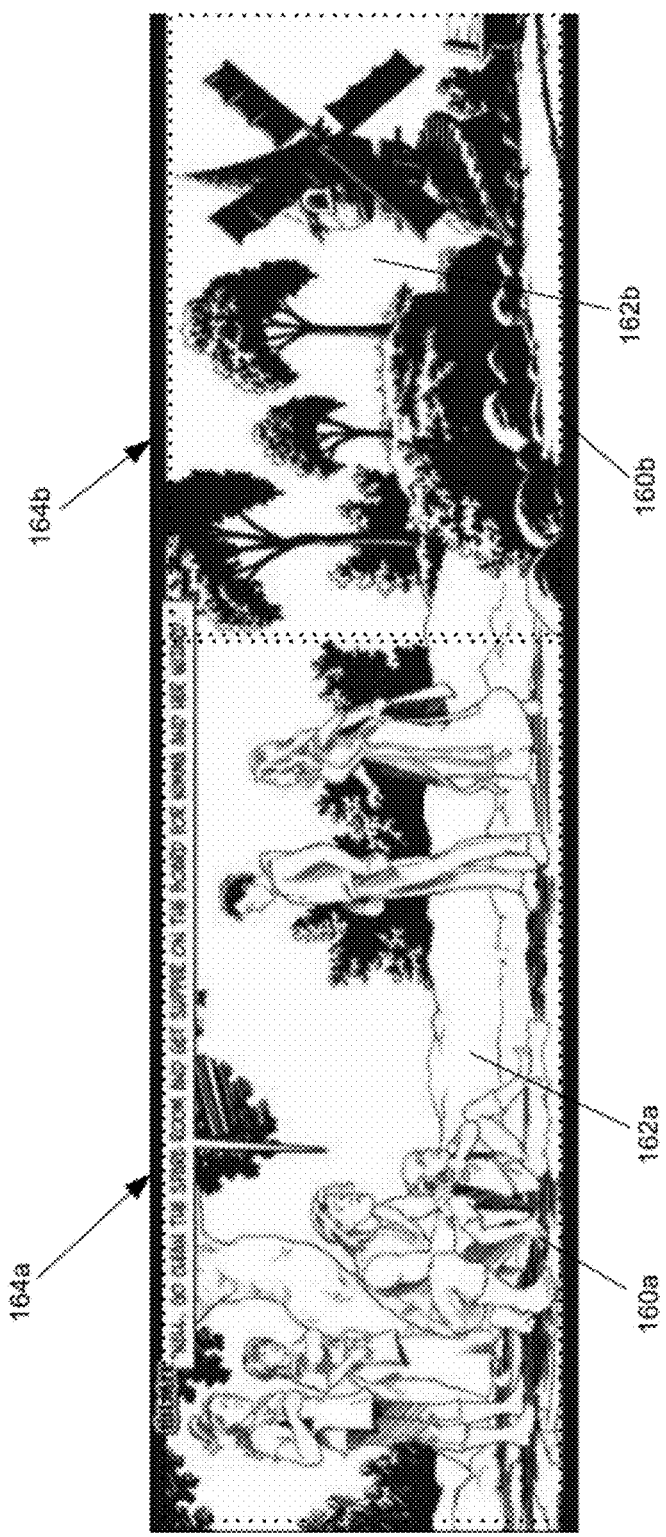
FIG. 12 is a portion of a continuous image having a transition relating to a change in a level of darkness between example images.

A change in a level of darkness may also distinguish the scenes of adjacent panels 160*a*-*b* as shown in FIG. 12. In the example shown, the levels of darkness 162*a*-*b* (or shading) changes between the panel 160*a* of the first image 164*a* and the panel 160*b* of the second image 164*b*. In the first panel 160*a*, the level of darkness 162*a* is substantially lower than the level of darkness 162*b* in the second panel 160*b*. As a result, the transition as a change in the level of darkness 162*a*-*b* between adjacent panels 160*a*-*b* distinguishes the scenes of the respective panels from one another. Thus, a transition of a visual grammar may relate to a change in the level of darkness of a first panel and the level of darkness of a second panel.

Figure 13:
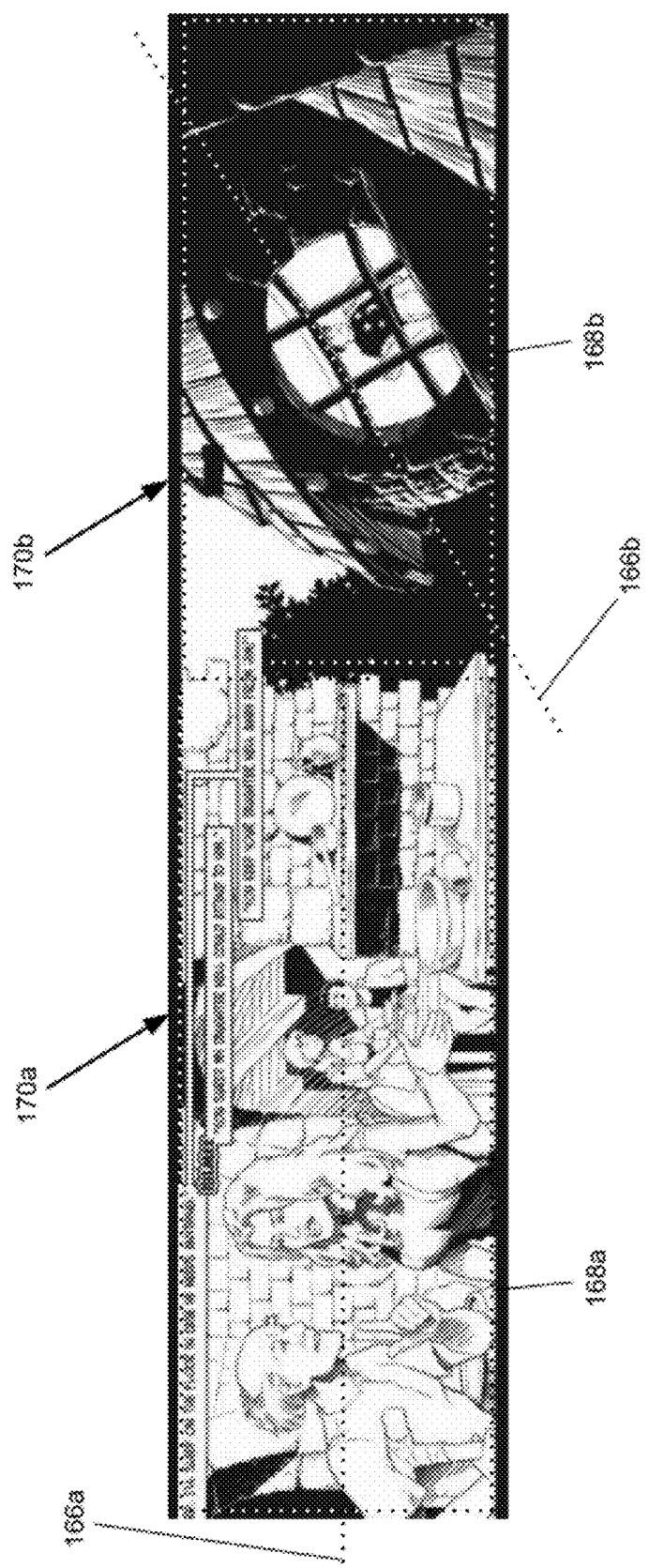
FIG. 13 is a portion of a continuous image having a transition relating to a change in perspective between example images.

As seen in FIG. 13, the transition of a visual grammar may also relate to different reference axes 166*a*-*b* for the panels 168*a*-*b* of adjacent images 170*a*-*b*. In the first panel 168*a*, the reference axis 166*a* is substantially horizontal, and the elements of the panel are positioned horizontally in accordance with the reference axis. In contrast, the reference axis 166*b* of the adjacent panel 168*b* is at an angle relative to the reference axis 166*a* of the first panel 168*a*. Consequently, the elements of the second panel 168*b* are positioned at an angle relative to the reference axis 166*a* and elements of the first panel 168*a*. Thus, the different reference axes distinguished between the scene of the first panel and the scene of the second panel.

Figure 14:
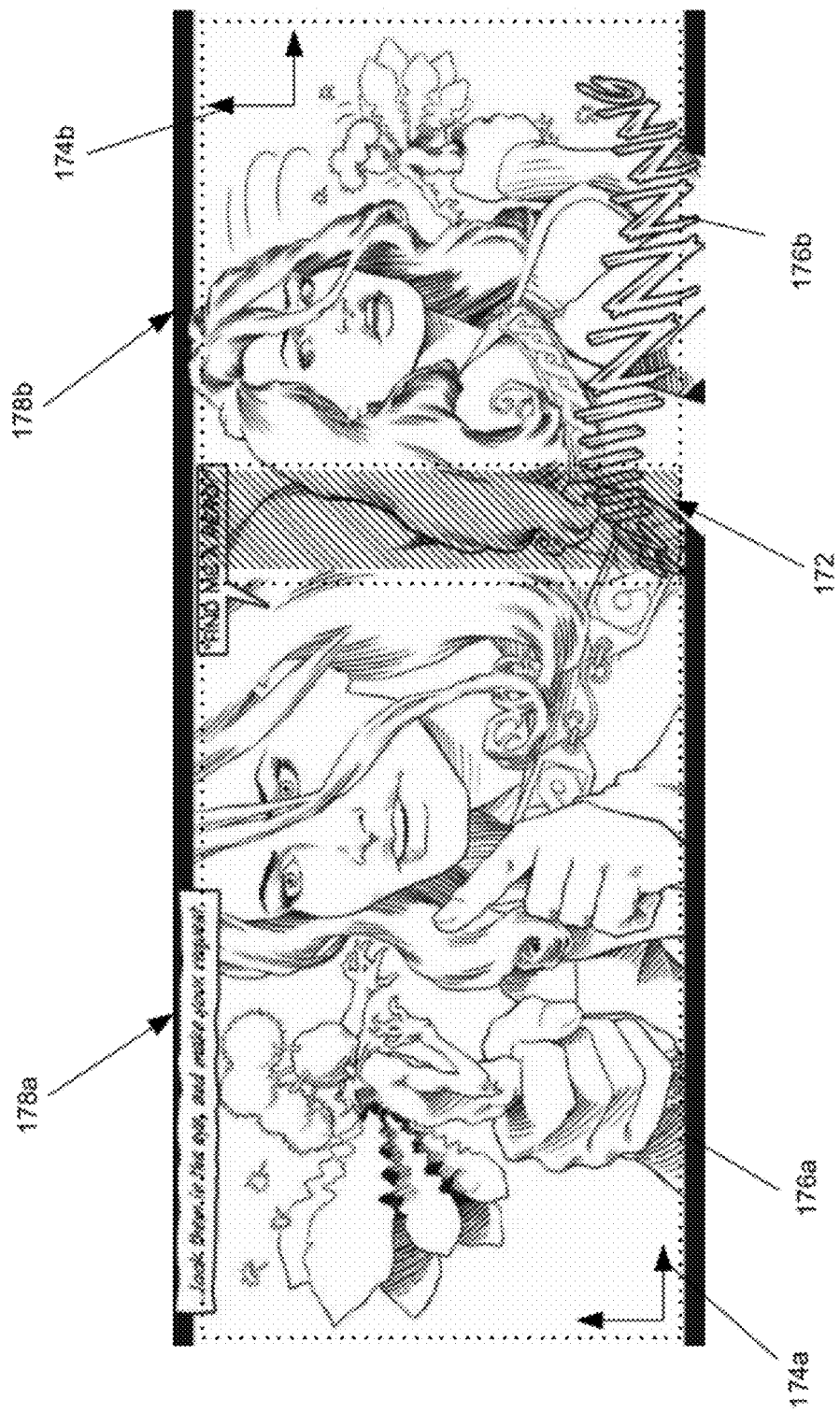
FIG. 14 is a portion of a continuous image having a transition relating to an overlap of image planes of example images.

A transition of a visual grammar may also relate to an overlapping portion 172 between the planes 174*a*-*b* of adjacent panels 176*a*-*b* as seen in FIG. 14. In the example shown, the panels 176*a*-*b* of each image 178*a*-*b* extend across a respective two-dimensional plane 174*a*-*b*. The plane 174*b* of the second panel 176*b*, in the example shown, overlaps the plane 174*a* of the first panel 176*a* creating an overlapping portion 172 between the panels of the adjacent images 178*a*-*b*. The overlapping portion thus distinguishes the scene of the first panel from the scene of the second panel.

Figure 15:
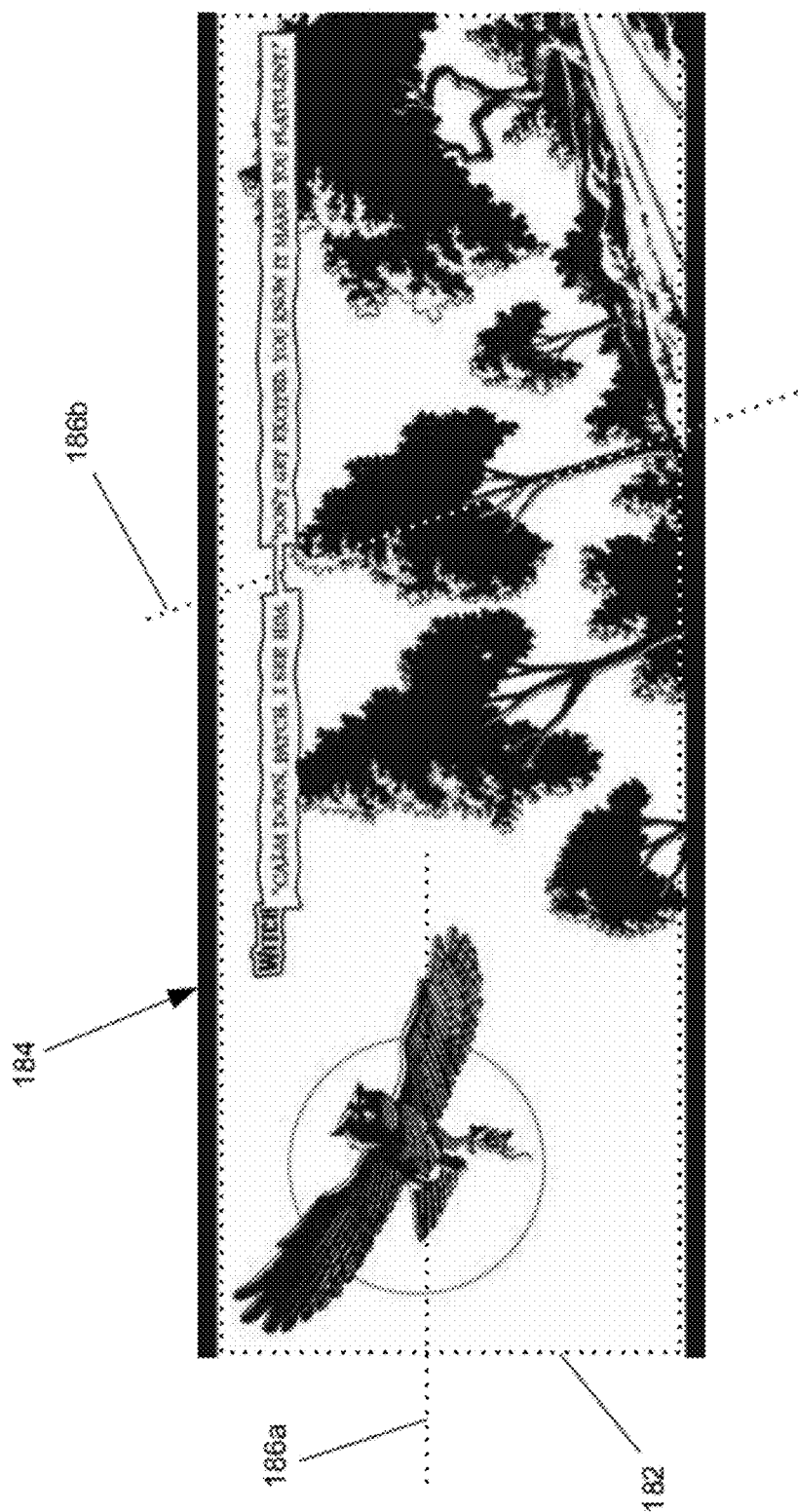
FIG. 15 is a portion of a continuous image having a transition relating to a gradual change in the perspective over an example image.

As mentioned above, a transition 180 may be incorporated into the panel 182 of an image 184 rather than positioned between adjacent panels of adjacent images. FIG. 15 illustrates an example transition 180 of a visual grammar that is incorporated into the panel 182 of the image 184. In particular, the example transition 180 is a gradual change in reference axes 186*a*-*b* along the length of a single individual image 184 as shown in FIG. 15. As seen in the image 184 of FIG. 15, the first reference axis 186*a* is substantially horizontal around the left side of the image 184 but gradually changes to a second reference axis 186*b* that is at an angle relative to the first reference axis 186*a* as the image progress to the right.

Figure 16:
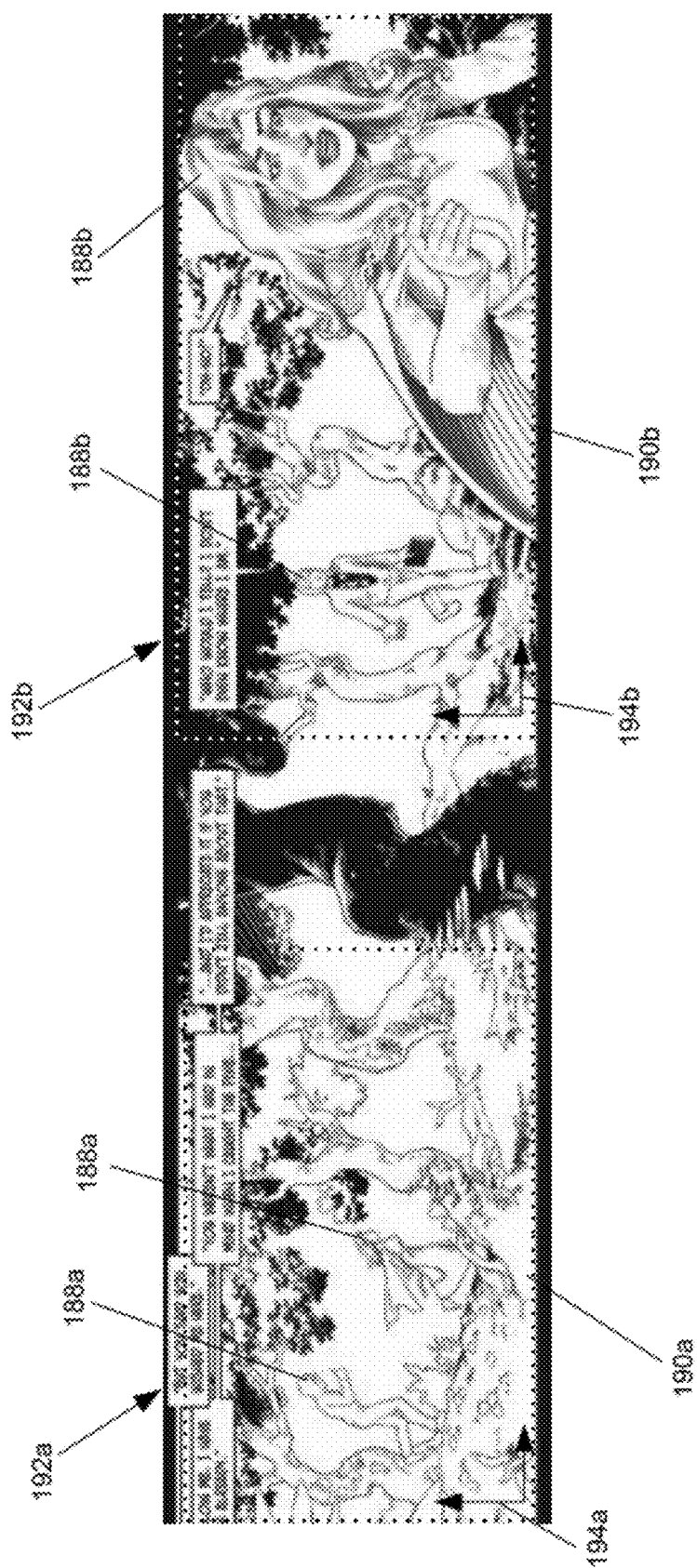
FIG. 16 is a portion of a continuous image having a transition relating to a change in proximity of image elements to an image plane between example images.

Referring now to FIG. 16, a change in the proximity of scene elements 188*a*-*b* between adjacent panels 190*a*-*b* may also be a transition of a visual grammar. As seen in FIG. 16, the scenes of the panels 190*a*-*b* of the adjacent images 192*a*-*b* include various foreground and background elements 188*a*-*b*. In the scene of the first panel 190*a*, some of the scene elements 188*a* are positioned relatively far away from the plane 194*a* of the image 192*a*. In comparison, the scene elements 188*b* in the panel 190*b* of the second image 192*b* are positioned relatively close to the plane 194*b* of the image. As a result, the difference in proximity of scene elements 188*a*-*b* between adjacent panels 190*a*-*b* distinguishes the scenes of the adjacent panels from one another.

Those skilled in the art will understand that the transitions set forth above are by way of example only. Accordingly, other visual grammars may selectively include alternative or additional transitions. Further, the transitions set forth above may selectively be employed when displaying a continuous image that may be horizontally or vertically scrolled. Moreover, a combination of transitions may selectively be employed to obscure the edges between adjacent images and distinguish between scenes of adjacent panels.

In addition to the system for continuously displaying individual images to present a visual narrative described above, a method for modifying individual images to present a visual narrative is also disclosed. The method may be employed when creating new images for presentation as a visual narrative. The method may also be employed when modifying existing images such as, for example, existing comic book panels for presentation as a visual narrative. In the case of adapting an existing comic book or other form of visual narrative for display as a continuous image, the existing content should be separated into individual panels and images.

The method also involves digitizing images that include at least a portion of a panel of the visual narrative as described above. For example, JPEG images may be created for the panels of a visual narrative. The panels may have been created for the purpose of presenting the images as a continuous image or the panels may have been obtained from an existing visual narrative as described above. The digital images contain image data corresponding to the panel of the narrative artwork. The digital images may be sized for display in a display window having a particular height. For example, a panel obtained from an existing visual narrative may be scaled down to fit the height of the display window that will display the visual narrative as a continuous image. Further, the text of a panel obtained from an existing visual narrative may be rearranged and adapted for display as a continuous image. For example, traditional comic book panels utilize word balloons for dialog and exposition, which may not be suited for visual narratives displayed as a continuous image; thus, text of the visual narrative may be reformatted and arranged for easy reading as the continuous image is scrolled.

Further, the images or the digital images may be modified to include a transition as described above. The transition may be added to either the images (before the images are digitized) or to the digital images (after the images are digitized). A sequence may be generated, such as an XML document as described above, that specifies an order for the digital images so that the digital images may be displayed in order when the images are displayed as a continuous image. The method may also include, as described above, storing the digital images at a storage module of a host device and transmitting the digital images across a network, such as the Internet, to a client device in response to receipt of a request for the digital images from the host device.

It will be understood, and is appreciated by persons skilled in the art, that one or more processes, sub-processes, or process steps described in connection with the figures may be performed by hardware and/or software. If the process is performed by software, the software may reside in software memory in a suitable electronic processing component or system such as, one or more of the functional components or modules schematically depicted in FIG. 1. The software in software memory may include an ordered listing of executable instructions for implementing logical functions (that is, "logic" that may be implemented either in digital form such as digital circuitry or source code), and may selectively be embodied in any non-transitory computer-readable medium for use by or in connection with an instruction execution system, apparatus, or device, such as a computer-based system, processor-containing system, or other system that may selectively fetch the instructions from the instruction execution system, apparatus, or device and execute the instructions.

In the context of this disclosure, a "non-transitory computer-readable medium" is any means that may contain, store, or communicate the program for use by or in connection with the instruction execution system, apparatus, or device. The non-transitory computer readable medium may selectively be, for example, but is not limited to, an electronic, magnetic, optical, electromagnetic, infrared, or semiconductor system, apparatus or device. More specific examples, but nonetheless a non-exhaustive list, of non-transitory computer-readable media would include the following: an internal or external hard disk drive, a portable computer diskette, a random-access memory (RAM), a read-only memory (ROM), an erasable programmable read-only memory (EPROM or Flash memory), a portable compact disc or read-only memory (CD-ROM), a portable digital versatile disc (DVD), and other suitable volatile or non-volatile storage systems, apparatuses, or devices. Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that a certain of the details described herein can be varied considerably without departing from the basic principles of the invention.

What is claimed is:

1. A system for continuously displaying individual images to present a visual narrative of a story sequence comprising:
a storage module storing a plurality of digital images, the images including first image data corresponding to a portion of at least one panel of narrative artwork and wherein at least one of the plurality of images includes second image data corresponding to a transition, the transition conforming to a visual grammar;
an image processor, the image processor retrieves the plurality of images from the storage module and arranges the image data of the plurality of images in an ordered configuration according to a predetermined sequence, the predetermined sequence specifying an order for the plurality of images; and
a display module, the display module accesses the ordered image data for display as a continuous seamless linear image of the story sequence with only a portion of the story sequence displayed as a user progress through the story sequence.

2. The system of claim 1 wherein the second image data corresponding to a transition is positioned between a first panel of narrative artwork and a second panel of narrative artwork.

3. The system of claim 1 wherein the second image data corresponding to a transition is incorporated into the image data of the at least one panel.

4. The system of claim 1 wherein the predetermined sequence is a digital list containing the order for the plurality of digital images and further comprising:
a parser, the parser parses the list to extract the order for the plurality of images.

5. The system of claim 1 wherein the plurality of images are transmitted across a network from a host to a client and wherein the plurality of images are displayed as the continuous seamless linear image on a display device at the client.

6. The system of claim 1 wherein the plurality of images include image data corresponding to a plurality of panels of narrative artwork and in which the images are displayed to form the continuous seamless linear image such that the continuous seamless linear image is adapted to be horizontally scrolled as the visual narrative of the story sequence is presented.

7. The system of claim 1 further comprising:
a supplemental image processor, the supplemental image processor positions supplemental image data on the at least one panel.

8. The system of claim 7 further comprising:
a randomizer, wherein the randomizer performs at least one of:
(a) randomly selecting supplemental image data from a group of supplemental image data, the group is associated with an image of the plurality of images; and
(b) generating a randomized position for the supplemental image data positioned on the at least one panel.

9. The system of claim 7 wherein a task is associated with the supplemental image data and further comprising:
a task executor, the task executor executes the task associated with the supplemental image data in response to user input.

10. The system of claim 9 wherein the task is navigating to a web page.

11. The system of claim 1 wherein only a portion of the continuous seamless linear image is displayed and further comprising:
an interface control for controlling the portion of the continuous seamless linear image displayed.

12. The system of claim 11 wherein the interface control comprises at least one of:
(a) a button translating the continuous seamless linear image towards a portion of a subsequent panel of the continuous seamless linear image in response to user input;
(b) a button translating the continuous seamless linear image towards a portion of a previous panel of the continuous seamless linear image in response to user input;
(c) a button for initiating automatic continuous translation of the continuous seamless linear image in response to a user input;
(d) a control element for selecting a translation speed such that the continuous seamless linear image is translated at the selected speed when automatic continuous translation is initiated;
(e) a control element for selecting a translation direction such that the continuous seamless linear image is translated in the selected direction when automatic continuous translation is initiated;
(f) a scrollbar for advancing the continuous seamless linear image in at least one of a forward or backward direction such that the portion of the continuous seamless linear image displayed corresponds to a position of the scrollbar; and
(g) a pointer adapted to grab the continuous seamless linear image wherein the continuous seamless linear image is translated in a direction and at a speed corresponding to movement of the pointer in response to user input.

13. The system of claim 1 wherein the visual grammar comprises at least one set of image data selected from at least one of:
(a) first image data corresponding to a first element of a first panel, the first element at a first proximity to a plane of the first panel, and second image data corresponding to a second element of a second panel, the second element at a second proximity to a plane of the second panel, where the first proximity differs from the second proximity;
(b) image data corresponding to a break positioned between a first border of a first panel and a second border of a second panel;
(c) image data corresponding to a separating element positioned between a first panel and a second panel;
(d) image data corresponding to a patterned element of a panel;
(e) first image data corresponding to a first plane of a first panel and second image data corresponding to a second plane of a second panel where the second plane overlaps the first plane;
(f) image data of a panel corresponding to a gradual change in a perspective along an axis of a panel;
(g) first image data of a first panel corresponding to a first perspective along a first axis of a first panel and second image data corresponding to a second perspective along a second axis of a second panel where the first perspective differs from the second perspective;
(h) first image data corresponding to a first color scheme of a first panel and second image data corresponding to a second color scheme of a second panel where the first color scheme differs from the second color scheme; and
(i) first image data corresponding to a first level of darkness of a first panel and second image data corresponding to a second level of darkness of a second panel where the first level of darkness differs from the second level of darkness.

14. A non-transitory computer readable storage medium with an executable program stored thereon for continuously presenting individual images to present a visual narrative of a story sequency, wherein the program instructs a processing device to perform steps comprising:
requesting a plurality of digital images from a storage module, the images including first image data corresponding to a portion of at least one panel of narrative artwork and wherein at least one of the plurality of images includes second image data corresponding to a transition, the transition conforming to a visual grammar;
arranging the image data of the plurality of images in an ordered configuration according to a predetermined sequence, the predetermined sequence specifying an order for the plurality of images; and
accessing the ordered image data for display as a continuous seamless linear image of the story sequence with only a portion of the story sequence visible to the user as the user seamlessly progresses through the story sequence.

15. The non-transitory computer readable storage medium of claim 14 wherein the second image data corresponding to a transition is positioned between a first panel of narrative artwork and a second panel of narrative artwork.

16. The non-transitory computer readable storage medium of claim 14 wherein the second image data corresponding to a transition is incorporated into the image data of the at least one panel.

17. The non-transitory computer readable storage medium of claim 14 wherein the predetermined sequence is a digital list containing the order for the plurality of digital images and the program further instructs the processing device to parse the list to extract the order for the plurality of images.

18. The non-transitory computer readable storage medium of claim 14 wherein the program instructs the processing device to further perform steps comprising:
submitting a request for the plurality of images to a host remote from the processing device;
arranging the image data of the plurality of images in the ordered configuration in response to receipt of the plurality of images; and
displaying a portion of the continuous seamless linear image on a display device.

19. The non-transitory computer readable storage medium of claim 14 wherein the plurality of images include image data corresponding to a plurality of panels of narrative artwork and in which the images are displayed to form the continuous seamless linear image such that the continuous seamless linear image is adapted to be horizontally scrolled as the visual narrative is presented.

20. The non-transitory computer readable storage medium of claim 14 wherein the program instructs the processing device to further perform a step comprising positioning on the at least one panel supplemental image data associated with an image of the plurality of images.

21. The non-transitory computer readable storage medium of claim 20 wherein the program instructs the processing device to further perform a step comprising randomly selecting supplemental image data from a group of supplemental image data, the group is associated with an image of the plurality of images.

22. The non-transitory computer readable storage medium of claim 20 wherein the program instructs the processing device to further perform steps comprising:
generating a randomized position for the supplemental image data; and
positioning the supplemental image data on the at least one panel associated with the supplemental image data at the randomized position.

23. The non-transitory computer readable storage medium of claim 20 wherein a task is associated with the supplemental image data and the program instructs the processing device to execute the task associated with the supplemental image data in response to user input.

24. The non-transitory computer readable storage medium of claim 23 wherein the task is navigating to a web page.

25. The non-transitory computer readable storage medium of claim 14 wherein the program instructs the processing device to further perform steps comprising:
displaying a portion of the continuous seamless linear image on a display device; and
adjusting the portion of the continuous seamless linear image displayed in response to user input from an interface control.

26. The non-transitory computer readable storage medium of claim 25 wherein the interface control comprises at least one of:
(a) a button translating the continuous seamless linear image towards a portion of a subsequent panel of the continuous seamless linear image in response to user input;
(b) a button translating the continuous seamless linear image towards a portion of a previous panel of the continuous seamless linear image in response to user input;
(c) a button for initiating automatic continuous translation of the continuous seamless linear image in response to a user input;
(d) a control element for selecting a translation speed such that the continuous seamless linear image is translated at the selected speed when automatic continuous translation is initiated;
(e) a control element for selecting a translation direction such that the continuous seamless linear image is translated in the selected direction when automatic continuous translation is initiated;
(f) a scrollbar for advancing the continuous seamless linear image in at least one of a forward or backward direction such that the portion of the continuous seamless linear image displayed corresponds to a position of the scrollbar; and
(g) a pointer adapted to grab the continuous seamless linear image wherein the continuous seamless linear image is translated in a direction and at a speed corresponding to movement of the pointer in response to user input.

27. The non-transitory computer readable storage medium of claim 14 wherein the visual grammar comprises at least one set of image data selected from at least one of:
(a) first image data corresponding to a first element of a first panel, the first element at a first proximity to a plane of the first panel, and second image data corresponding to a second element of a second panel, the second element at a second proximity to a plane of the second panel, where the first proximity differs from the second proximity;
(b) image data corresponding to a break positioned between a first border of a first panel and a second border of a second panel;
(c) image data corresponding to a separating element positioned between a first panel and a second panel;
(d) image data corresponding to a patterned element of a panel;
(e) first image data corresponding to a first plane of a first panel and second image data corresponding to a second plane of a second panel where the second plane overlaps the first plane;
(f) image data of a panel corresponding to a gradual change in a perspective along an axis of a panel;
(g) first image data of a first panel corresponding to a first perspective along a first axis of a first panel and second image data corresponding to a second perspective along a second axis of a second panel where the first perspective differs from the second perspective;
(h) first image data corresponding to a first color scheme of a first panel and second image data corresponding to a second color scheme of a second panel where the first color scheme differs from the second color scheme; and
(i) first image data corresponding to a first level of darkness of a first panel and second image data corresponding to a second level of darkness of a second panel where the first level of darkness differs from the second level of darkness.

28. A method for modifying individual images to present a visual narrative comprising:
digitizing a plurality of images, the images include a portion of at least one panel of narrative artwork, to obtain a plurality of digital images, the digital images having image data corresponding to the portion of the at least one panel of narrative artwork;
modifying at least one of the plurality of images or the plurality of digital images to include a transition, the transition conforming to a visual grammar; and
generating a sequence, the sequence specifying an order for the plurality of digital images such that the plurality of digital images are displayed according to the order as a continuous seamless linear image of the story sequence with only a portion of the story sequence displayed as a user progress through the story sequence.

29. The method of claim 28 wherein the second image data corresponding to a transition is positioned between a first panel of narrative artwork and a second panel of narrative artwork.

30. The method of claim 28 wherein the second image data corresponding to a transition is incorporated into the image data of at least one panel.

31. The method of claim 28 wherein the predetermined sequence is a digital list containing the order for the plurality of digital images.

32. The method of claim 28 further comprising:
storing the plurality of digital images in a storage module of a host device; and
transmitting at least one of the plurality of images across a network from the host device to a client device in response to a request received at the host device.

33. The method of claim 28 wherein the plurality of digital images include image data corresponding to a plurality of panels of narrative artwork in which, when the images are displayed, the images form the continuous seamless linear image such that the continuous seamless linear image is adapted to be horizontally scrolled as the visual narrative is presented.

34. The method of claim 28 further comprising associating supplemental image data with at least one panel wherein the supplemental image data is positioned on the at least one panel when the plurality of digital images is displayed.

35. The method of claim 34 further comprising associating an offset range with the supplemental image data wherein the supplemental image data is positioned on the at least one panel at a randomized position within the offset range when the plurality of images is displayed.

36. The method of claim 34 wherein a task is associated with the supplemental image data, and further comprising executing the task associated with the supplemental image data in response to user input.

37. The method of claim 36 wherein the task is navigating to a web page.

38. The method of claim 28 wherein the visual grammar comprises at least one set of image data selected from at least one of:
  (a) first image data corresponding to a first element of a first panel, the first element at a first proximity to a plane of the first panel, and second image data corresponding to a second element of a second panel, the second element at a second proximity to a plane of the second panel, where the first proximity differs from the second proximity;
  (b) image data corresponding to a break positioned between a first border of a first panel and a second border of a second panel;
  (c) image data corresponding to a separating element positioned between a first panel and a second panel;
  (d) image data corresponding to a patterned element of a panel;
  (e) first image data corresponding to a first plane of a first panel and second image data corresponding to a second plane of a second panel where the second plane overlaps the first plane;
  (f) image data of a panel corresponding to a gradual change in a perspective along an axis of a panel;
  (g) first image data of a first panel corresponding to a first perspective along a first axis of a first panel and second image data corresponding to a second perspective along a second axis of a second panel where the first perspective differs from the second perspective;
  (h) first image data corresponding to a first color scheme of a first panel and second image data corresponding to a second color scheme of a second panel where the first color scheme differs from the second color scheme; and
  (i) first image data corresponding to a first level of darkness of a first panel and second image data corresponding to a second level of darkness of a second panel where the first level of darkness differs from the second level of darkness.

* * * * *